United States Patent
Okuike

(10) Patent No.: US 12,108,183 B2
(45) Date of Patent: Oct. 1, 2024

(54) SOLID-STATE IMAGING APPARATUS

(71) Applicant: SONY SEMICONDUCTOR SOLUTIONS CORPORATION, Kanagawa (JP)

(72) Inventor: Kazuyuki Okuike, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 14 days.

(21) Appl. No.: 17/905,863

(22) PCT Filed: Mar. 3, 2021

(86) PCT No.: PCT/JP2021/008301
§ 371 (c)(1),
(2) Date: Sep. 8, 2022

(87) PCT Pub. No.: WO2021/187121
PCT Pub. Date: Sep. 23, 2021

(65) Prior Publication Data
US 2023/0128031 A1    Apr. 27, 2023

(30) Foreign Application Priority Data
Mar. 19, 2020 (JP) ................... 2020-049489

(51) Int. Cl.
*H04N 25/78* (2023.01)
*G06V 10/82* (2022.01)
*H04N 25/46* (2023.01)
*H04N 25/772* (2023.01)

(52) U.S. Cl.
CPC ............. *H04N 25/78* (2023.01); *G06V 10/82* (2022.01); *H04N 25/46* (2023.01); *H04N 25/772* (2023.01)

(58) Field of Classification Search
None
See application file for complete search history.

(56) References Cited

U.S. PATENT DOCUMENTS

| | | | |
|---|---|---|---|
| 9,456,195 B1 * | 9/2016 | Wajs | H04N 5/2226 |
| 2014/0313386 A1 * | 10/2014 | Jiang | H01L 27/14654 |
| | | | 348/308 |
| 2019/0325746 A1 * | 10/2019 | Lewis | G06F 3/013 |

FOREIGN PATENT DOCUMENTS

| | | |
|---|---|---|
| JP | 2005-278060 A | 10/2005 |
| JP | 2017-204784 A | 11/2017 |
| JP | 2020-039124 A | 3/2020 |
| WO | 2018/051809 A1 | 3/2018 |

OTHER PUBLICATIONS

International Search Report and Written Opinion of PCT Application No. PCT/JP2021/008301, issued on May 25, 2021, 08 pages of ISRWO.

* cited by examiner

*Primary Examiner* — Mark T Monk
(74) *Attorney, Agent, or Firm* — CHIP LAW GROUP

(57) ABSTRACT

Provided is a solid-state imaging apparatus that includes an imaging section that acquires image data. The solid-state imaging apparatus further includes a control section that changes time of reading out the image data based on time of DNN processing on the image data and a result of the DNN processing on the image data.

9 Claims, 20 Drawing Sheets

| CONTROL # | AD BITS | BINNING |
|---|---|---|
| #1 | 12 | Full |
| #2 | 10 | Full |
| #3 | 8 | Full |
| #4 | 8 | V2H2 |
| #5 | 6 | V2H2 |
| #6 | 6 | V4H4 |
| #7 | 4 | V4H4 |
| #8 | 4 | V8H8 |

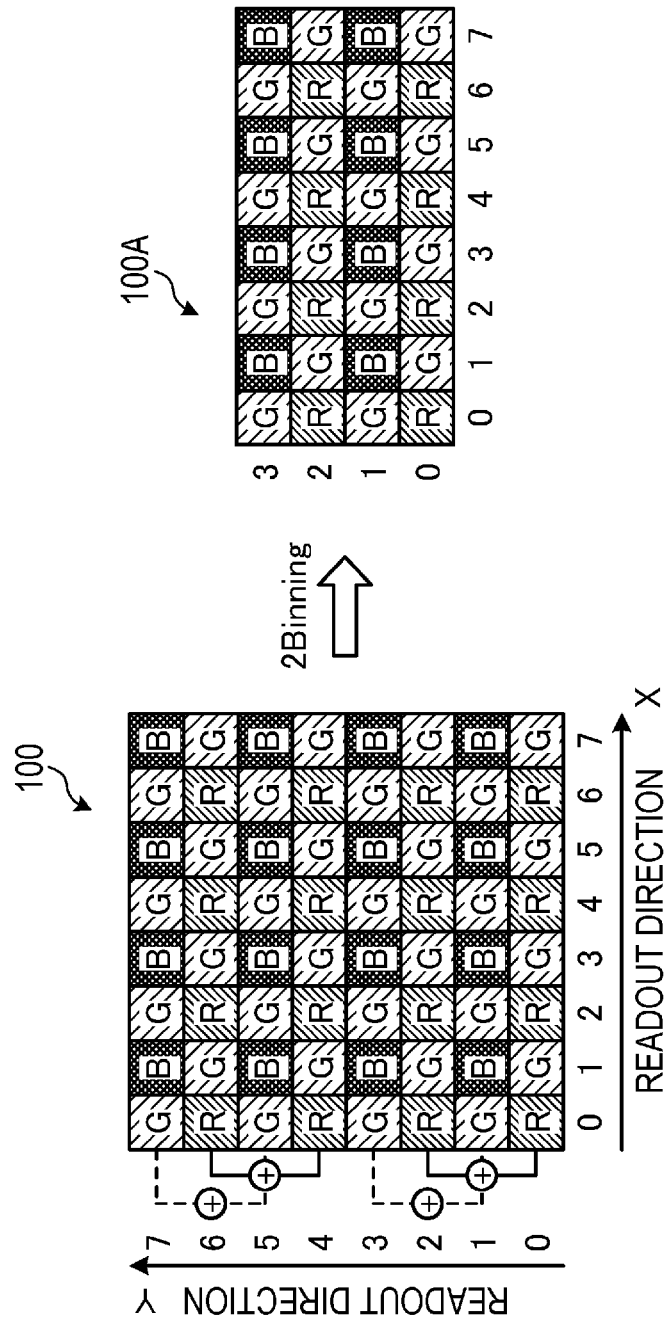

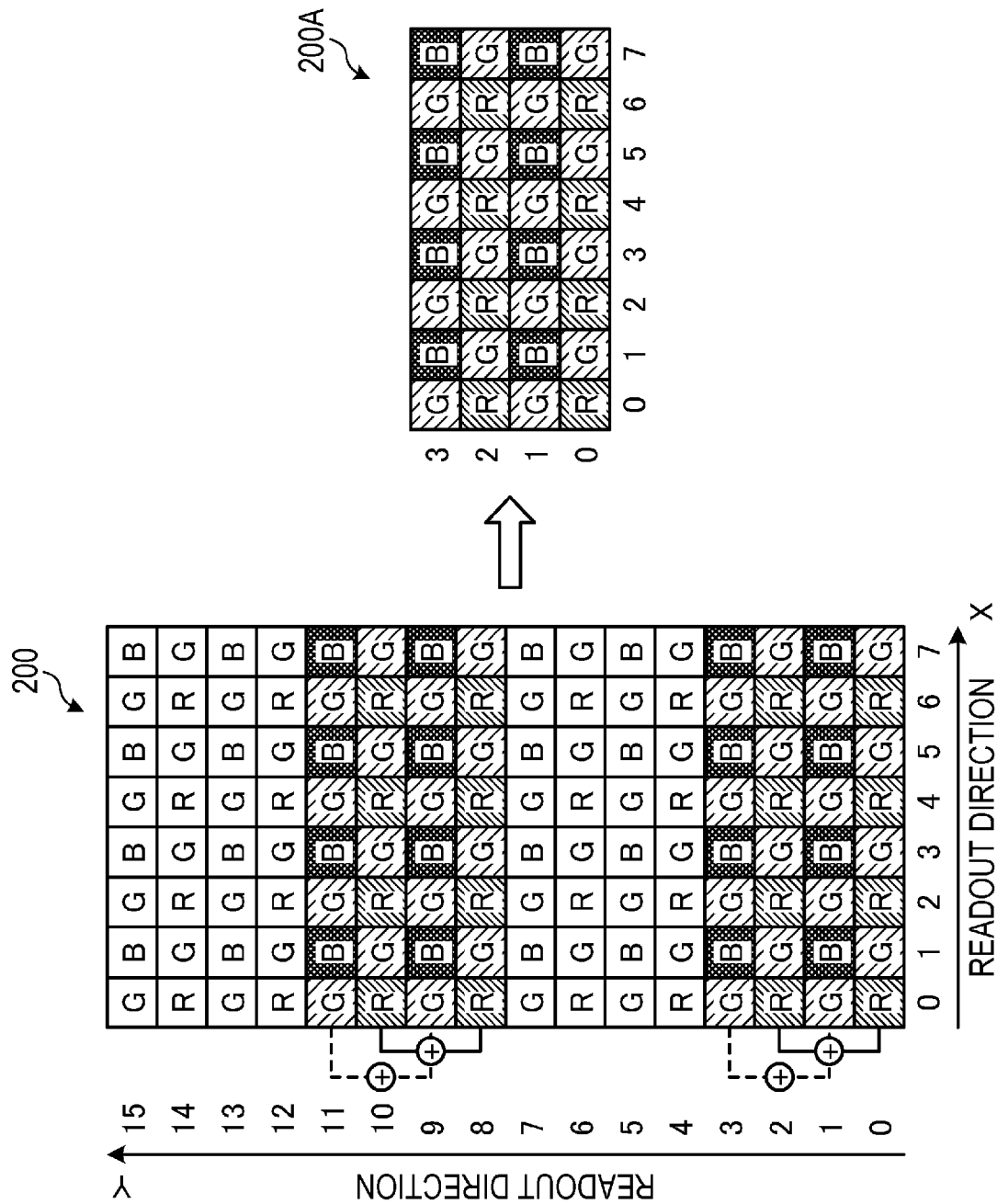

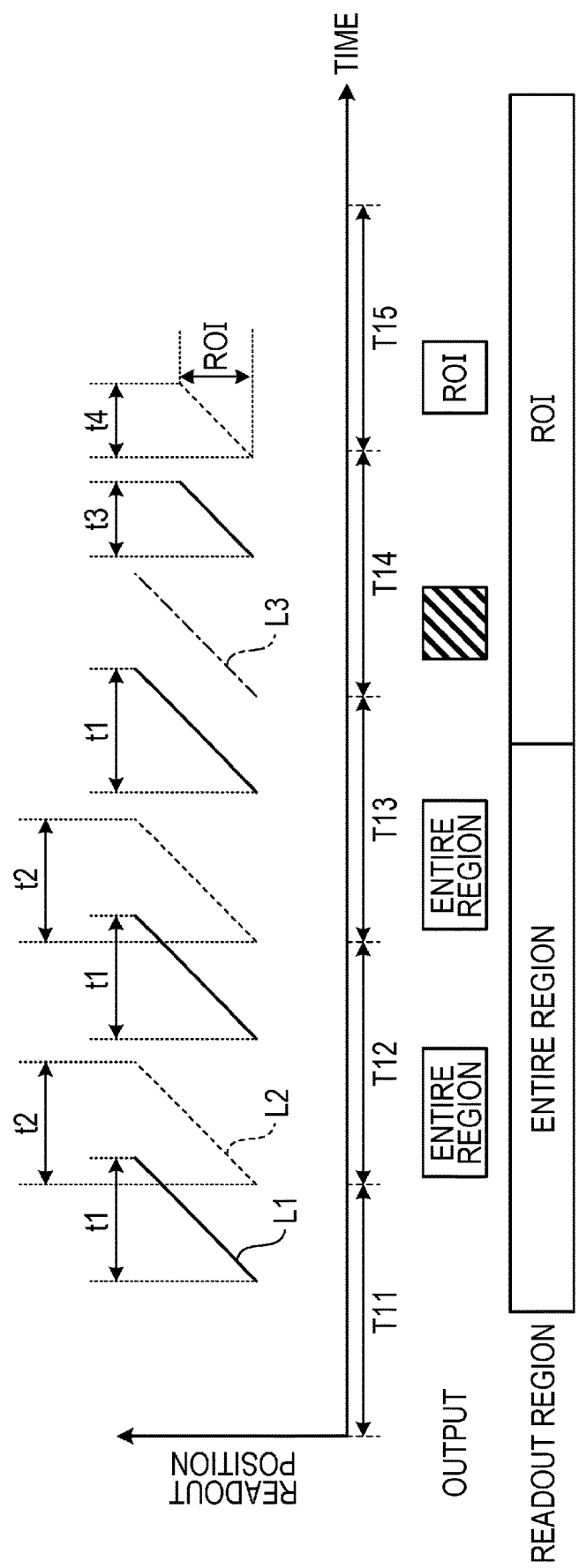

| RECOGNITION TARGET | CLASS | SCORE |
|---|---|---|
| | MOUSETRAP | 0.36 |
| | MARMOSET | 0.07 |
| | HOUSE FINCH | 0.05 |
| | ... | ... |

| RECOGNITION TARGET | CLASS | SCORE |
|---|---|---|
| | BEAGLE | 0.26 |
| | FOXHOUND | 0.23 |
| | ENGLISH FOXHOUND | 0.17 |
| | ... | ... |

SOLID-STATE IMAGING APPARATUS

CROSS REFERENCE TO RELATED APPLICATIONS

This application is a U.S. National Phase of International Patent Application No. PCT/JP2021/008301 filed on Mar. 3, 2021, which claims priority benefit of Japanese Patent Application No. JP 2020-049489 filed in the Japan Patent Office on Mar. 19, 2020. Each of the above-referenced applications is hereby incorporated herein by reference in its entirety.

TECHNICAL FIELD

The present disclosure relates to a solid-state imaging apparatus.

BACKGROUND ART

An image sensor having a complementary metal oxide semiconductor (CMOS) and a digital signal processor (DSP) is mounted on a device represented by a digital camera or the like. In the image sensor, a captured image is supplied to the DSP, is subjected to various pieces of processing in the DSP, and is outputted to an external apparatus such as an application processor.

CITATION LIST

Patent Document

Patent Literature 1: WO 2018/051809 A

SUMMARY OF THE INVENTION

Problems to be Solved by the Invention

However, in the above technology, in a case where the DSP executes heavy load processing or executes high-speed image data readout, there may be a case where processing by the DSP is not completed in a predetermined period such as one frame period and the DSP cannot appropriately execute the processing.

Thus, the present disclosure proposes a solid-state imaging apparatus capable of appropriately executing processing.

Solutions to Problems

A solid-state imaging apparatus of an aspect according to the present disclosure includes: an imaging section that acquires image data; and a control section that changes time of reading out the image data in accordance with time of DNN processing on the image data.

BRIEF DESCRIPTION OF DRAWINGS

FIG. 13B is a diagram for describing the processing of changing the resolution of a captured image.

FIG. 13E is a diagram for describing the processing of changing the resolution of a captured image.

FIG. 14A is a diagram for describing a method for reading out an ROI.

MODE FOR CARRYING OUT THE INVENTION

Figure 1:
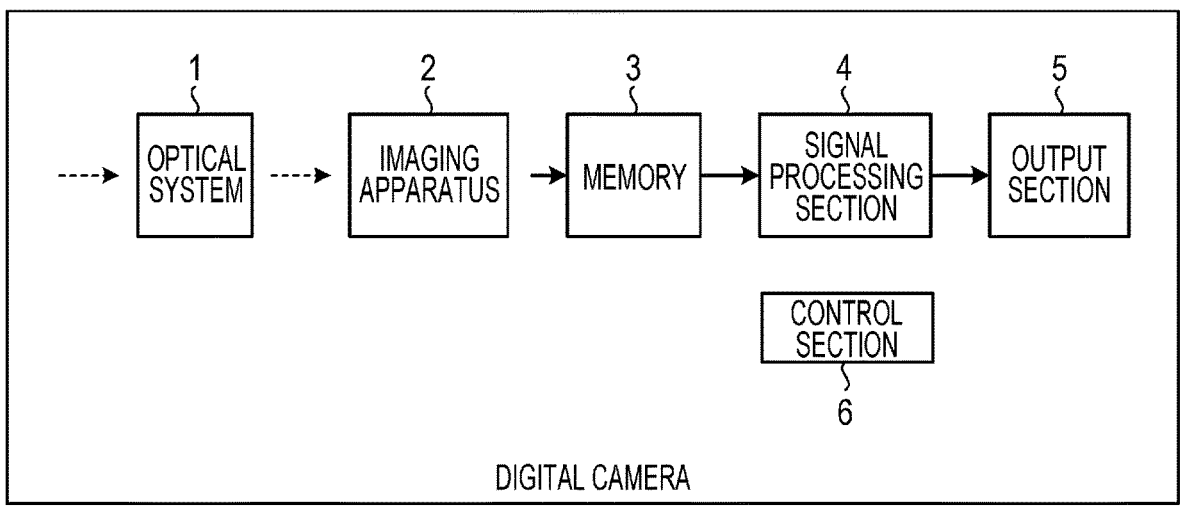
FIG. 1 is a block diagram showing an example of a configuration of a digital camera according to an embodiment.

Hereinbelow, embodiments of the present disclosure are described in detail on the basis of the drawings. Note that in the following embodiments, the same parts are marked with the same reference numerals, and a repeated description is omitted.

Note that the description is given in the following order.
1. Overview
   1-1. Configuration example of digital camera
   1-2. Configuration example of imaging apparatus
   1-3. External appearance configuration example of imaging apparatus
2. Comparative Example
   2-1. Processing mode of comparative example
3. Embodiments
   3-1. First processing mode
   3-2. Second processing mode
   3-3. Third processing mode
   3-4. Fourth processing mode
   3-5. Imaging control processing
   3-6. Resolution control
   3-7. ROI control 3-8. FPS control
3-9. Class sorting
3-10. Key point processing
4. Effects

1. Overview

[1-1. Configuration Example of Digital Camera]
<One Embodiment of Digital Camera to which Present Technology is Applied>

FIG. 1 is a block diagram showing a configuration example of an embodiment of a digital camera to which the present technology is applied.

Note that the digital camera can capture both still images and moving images.

In FIG. 1, the digital camera includes an optical system 1, an imaging apparatus 2, a memory 3, a signal processing section 4, an output section 5, and a control section 6.

The optical system 1 includes, for example, a zoom lens, a focus lens, a diaphragm, etc. not illustrated, and causes light from the outside to be incident on the imaging apparatus 2.

The imaging apparatus 2 is, for example, a complementary metal oxide semiconductor (CMOS) image sensor formed by using one chip; and receives incident light from the optical system 1, performs photoelectric conversion, and outputs image data corresponding to the incident light from the optical system 1.

Further, the imaging apparatus 2 uses the image data or the like to perform, for example, recognition processing of recognizing a predetermined recognition target and other signal processing, and outputs a signal processing result of the signal processing.

The memory 3 temporarily stores the image data or the like outputted by the imaging apparatus 2.

The signal processing section 4 performs, as necessary, processing such as denoising and white balance adjustment as camera signal processing using the image data stored in the memory 3, and supplies the result to the output section 5.

The output section 5 outputs the image data from the signal processing section 4 or a signal processing result stored in the memory 3.

That is, the output section 5 includes, for example, a display (not illustrated) including liquid crystals or the like, and displays, as what is called a through image, an image corresponding to the image data from the signal processing section 4.

Further, the output section 5 includes, for example, a driver (not illustrated) that drives a recording medium such as a semiconductor memory, a magnetic disk, or an optical disk, and records, on the recording medium, the image data from the signal processing section 4 or a signal processing result stored in the memory 3.

Moreover, the output section 5 functions as, for example, an interface (I/F) that performs data transmission with an external apparatus, and transmits the image data from the signal processing section 4, the image data recorded on the recording medium, or the like to the external apparatus.

The control section 6 controls each block included in the digital camera in accordance with the user's operation or the like.

In the digital camera configured in the above manner, the imaging apparatus 2 captures an image. That is, the imaging apparatus 2 receives incident light from the optical system 1, performs photoelectric conversion, acquires image data corresponding to the incident light, and outputs the image data.

The image data outputted by the imaging apparatus 2 is supplied to and stored in the memory 3. The image data stored in the memory 3 is subjected to camera signal processing by the signal processing section 4, and the resulting image data is supplied to the output section 5 and is outputted.

Further, the imaging apparatus 2 performs signal processing by using an image (data) or the like obtained by imaging, and outputs a signal processing result of the signal processing. A signal processing result outputted by the imaging apparatus 2 is, for example, stored in the memory 3.

In the imaging apparatus 2, the output of an image itself obtained by imaging and the output of a signal processing result of signal processing using the image or the like are selectively performed.

[1-2. Configuration Example of Imaging Apparatus]

Figure 2:
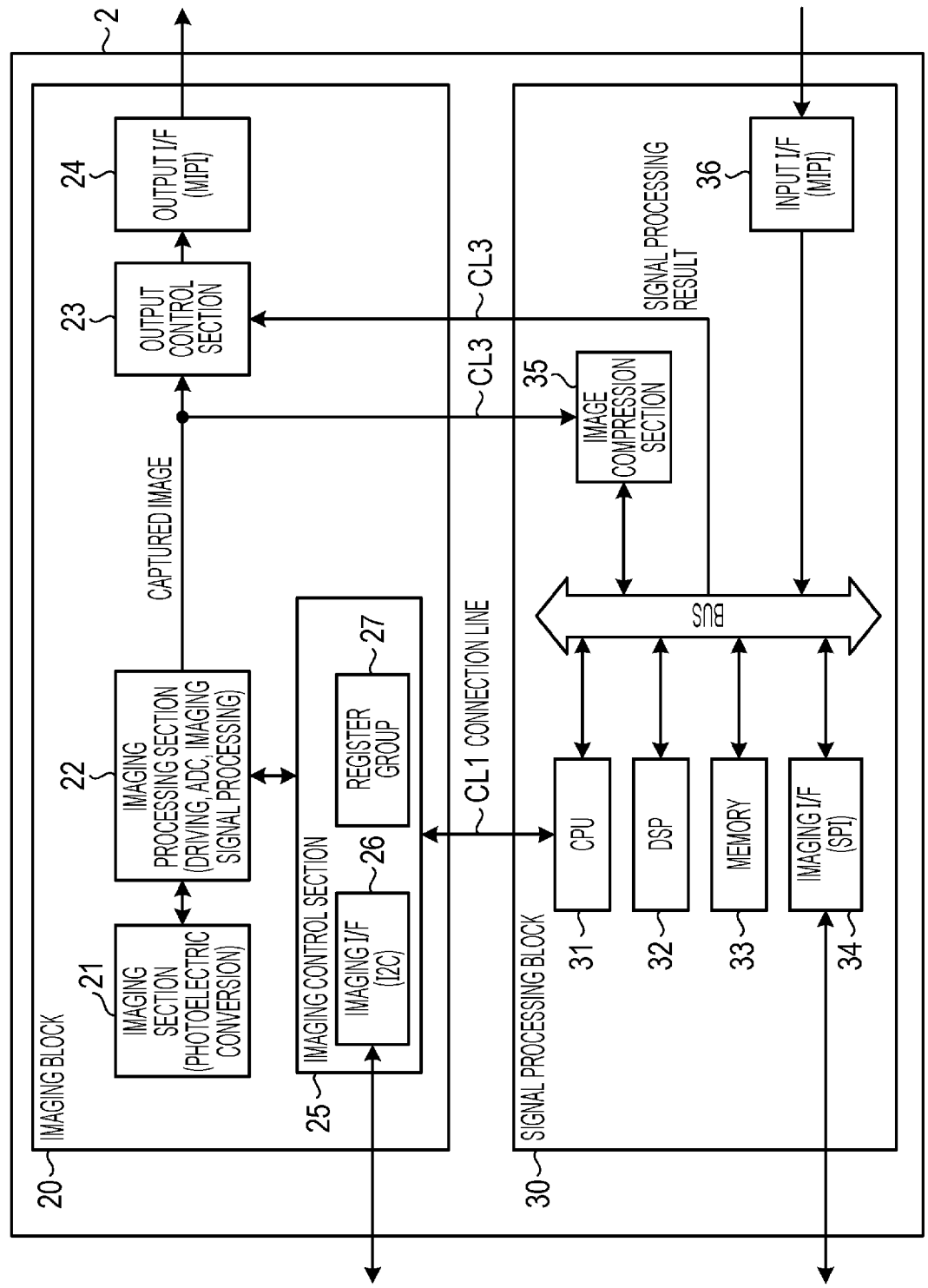
FIG. 2 is a block diagram showing an example of a configuration of an imaging apparatus according to an embodiment.

FIG. 2 is a block diagram showing a configuration example of the imaging apparatus 2 of FIG. 1.

In FIG. 2, the imaging apparatus 2 includes an imaging block 20 and a signal processing block 30. The imaging block 20 and the signal processing block 30 are electrically connected by connection lines (internal buses) CL1, CL2, and CL3.

The imaging block 20 includes an imaging section 21, an imaging processing section 22, an output control section 23, an output interface (I/F) 24, and an imaging control section 25, and captures an image.

The imaging section 21 includes a plurality of pixels arranged two-dimensionally. The imaging section 21 is driven by the imaging processing section 22, and captures an image.

That is, light from the optical system 1 (FIG. 1) is incident on the imaging section 21. In each pixel, the imaging section 21 receives incident light from the optical system 1, performs photoelectric conversion, and outputs an analog image signal corresponding to the incident light.

Note that the size of the image (signal) outputted by the imaging section 21 may be chosen from, for example, a plurality of sizes such as 12M (3968×2976) pixels and a video graphics array (VGA) size (640×480 pixels).

Further, the type of the image outputted by the imaging section 21 may be chosen from, for example, a color image of RGB (red, green, and blue) and a monochrome image of only luminance.

Each of these choices may be performed as a kind of setting of an imaging mode.

The imaging processing section 22 performs, in accordance with the control of the imaging control section 25, imaging processing related to the capture of an image in the imaging section 21, such as the driving of the imaging section 21, analog to digital (AD) conversion of an analog image signal outputted by the imaging section 21, or imaging signal processing.

Here, examples of the imaging signal processing include processing in which, for an image outputted by the imaging section 21, the brightness of each of predetermined small regions is obtained by a method such as calculating the average value of pixel values for each of the small regions, processing in which an image outputted by the imaging section 21 is converted to a high dynamic range (HDR) image, defect correction, development, etc.

The imaging processing section 22 outputs, as a captured image, a digital image signal (here, for example, an image of 12M pixels or a VGA size) obtained by AD conversion or the like of an analog image signal outputted by the imaging section 21.

A captured image outputted by the imaging processing section 22 is supplied to the output control section 23, and is also supplied to an image compression section 35 of the signal processing block 30 via connection line CL2.

To the output control section 23, a captured image is supplied from the imaging processing section 22, and a signal processing result of signal processing using a captured image or the like is supplied from the signal processing block 30 via connection line CL3.

The output control section 23 performs output control of causing a captured image from the imaging processing section 22 and a signal processing result from the signal processing block 30 to be selectively outputted from the (one) output I/F 24 to the outside (for example, the memory 3 of FIG. 1, or the like).

That is, the output control section 23 chooses a captured image from the imaging processing section 22 or a signal processing result from the signal processing block 30, and supplies the chosen thing to the output I/F 24.

The output I/F 24 is an I/F that outputs, to the outside, a captured image and a signal processing result supplied from the output control section 23. As the output I/F 24, for example, a relatively high-speed parallel I/F such as a mobile industry processor interface (MIPI), or the like may be used.

On the output I/F 24, a captured image from the imaging processing section 22 or a signal processing result from the signal processing block 30 is outputted to the outside in accordance with output control of the output control section 23. Therefore, for example, in a case where, in the outside, only a signal processing result from the signal processing block 30 is needed and a captured image itself is not needed, solely the signal processing result may be outputted, and the amount of data outputted from the output I/F 24 to the outside can be reduced.

Further, by a process in which signal processing that provides a signal processing result required in the outside is performed in the signal processing block 30 and the signal processing result is outputted from the output I/F 24, the necessity to perform signal processing in the outside is eliminated, and the load of an external block can be reduced.

The imaging control section 25 includes a communication I/F 26 and a register group 27.

The communication I/F 26 is, for example, a first communication I/F such as a serial communication I/F such as an inter-integrated circuit (I2C), and exchanges, with the outside (for example, the control section 6 of FIG. 1, or the like), necessary information such as information that is read from or written on the register 27 group.

The register group 27 includes a plurality of registers, and stores imaging information regarding the capture of an image in the imaging section 21 and various other pieces of information.

For example, the register group 27 stores imaging information received from the outside on the communication I/F 26 and a result of imaging signal processing in the imaging processing section 22 (for example, the brightness of each small region of a captured image, or the like).

Examples of the imaging information stored in the register group 27 include the ISO sensitivity (analog gain at the time of AD conversion in the imaging processing section 22), the exposure time (shutter speed), the frame rate, the focus, the imaging mode, the clipping range, etc. (or information indicating them).

Examples of the imaging mode include a manual mode in which the exposure time, the frame rate, etc. are manually set and an automatic mode in which they are automatically set in accordance with the scene. Examples of the automatic mode include modes corresponding to various imaging scenes such as a night scene and a person's face.

Further, the clipping range refers to a range clipped from an image outputted by the imaging section 21 in a case where the imaging processing section 22 clips part of an image outputted by the imaging section 21 and outputs the part as a captured image. By specifying the clipping range, for example, it becomes possible to clip, from an image outputted by the imaging section 21, solely a range where a person is present, or the like. Note that, as image clipping, there are a method in which clipping is performed from an image outputted by the imaging section 21 and furthermore a method in which solely an image (signal) of a clipping range is read out from the imaging section 21.

The imaging control section 25 controls the imaging processing section 22 in accordance with imaging information stored in the register group 27, and thus controls the capture of an image in the imaging section 21.

Note that the register group 27 can store imaging information and a result of imaging signal processing in the imaging processing section 22, and furthermore output control information regarding output control in the output control section 23. The output control section 23 can perform output control of causing a captured image and a signal processing result to be selectively outputted in accordance with output control information stored in the register group 27.

Further, in the imaging apparatus 2, the imaging control section 25 and a central processing unit (CPU) 31 of the signal processing block 30 are connected via connection line CL1, and the CPU 31 can perform the reading and writing of information on the register group 27 via connection line CL1.

That is, in the imaging apparatus 2, the reading and writing of information on the register group 27 can be performed not only from the communication I/F 26 but also from the CPU 31.

The signal processing block 30 includes a CPU 31, a digital signal processor (DSP) 32, a memory 33, a communication I/F 34, an image compression section 35, and an input I/F 36, and performs predetermined signal processing by using a captured image or the like obtained in the imaging block 10.

The CPU 31 to the input I/F 36 included in the signal processing block 30 are connected to each other via a bus, and can exchange information as necessary.

The CPU 31 executes a program stored in the memory 33 to perform the control of the signal processing block 30, the reading and writing of information on the register group 27 of the imaging control section 25 via connection line CL1, and various other pieces of processing. The CPU 31 is also called a control section.

For example, the CPU 31, by executing a program, functions as an imaging information calculation section that calculates imaging information by using a signal processing result obtained by signal processing in the DSP 32; and feeds back new imaging information calculated by using a signal processing result to the register group 27 of the imaging control section 25 via connection line CL1, and causes the register group 27 to store the new imaging information.

Therefore, as a result, the CPU 31 can control imaging in the imaging section 21 and imaging signal processing in the imaging processing section 22 in accordance with the signal processing result of a captured image.

Further, imaging information that the CPU 31 has caused the register group 27 to store can be provided (outputted) to the outside from the communication I/F 26. For example, focus information in the imaging information stored in the register group 27 can be provided from the communication I/F 26 to a focus driver (not illustrated) that controls the focus.

The DSP 32, by executing a program stored in the memory 33, functions as a signal processing section that performs signal processing using a captured image supplied from the imaging processing section 22 to the signal processing block 30 via connection line CL2 or information received by the input I/F 36 from the outside.

By reading out and executing a program that is subjected in advance to learning with teacher data and is stored as a learning model in the memory 33, the DSP 32 performs recognition processing using a deep neural network (DNN). That is, the DSP 32 is configured as a machine learning section.

The memory 33 includes a static random access memory (SRAM), a dynamic RAM (DRAM), or the like, and stores data or the like necessary for processing of the signal processing block 30.

For example, the memory 33 stores a program received from the outside on the communication I/F 34, a captured image compressed in the image compression section 35 and used for signal processing in the DSP 32, a signal processing result of signal processing performed in the DSP 32, information received by the input I/F 36, etc.

The communication I/F 34 is, for example, a second communication I/F such as a serial communication I/F such as a serial peripheral interface (SPI), and exchanges, with the outside (for example, the memory 3 or the control section 6 of FIG. 1, or the like), necessary information such as a program to be executed by the CPU 31 or the DSP 32.

For example, the communication I/F 34 downloads, from the outside, a program to be executed by the CPU 31 or the DSP 32, supplies the program to the memory 33, and causes the memory 33 to store the program.

Therefore, various pieces of processing can be executed in the CPU 31 or the DSP 32 by means of a program downloaded by the communication I/F 34.

Note that the communication I/F 34 can exchange, with the outside, arbitrary data in addition to programs. For example, the communication I/F 34 can output, to the outside, a signal processing result obtained by signal processing in the DSP 32. Further, the communication I/F 34 can output information according to an instruction of the CPU 31 to an external apparatus to control the external apparatus in accordance with the instruction of the CPU 31.

Here, a signal processing result obtained by signal processing in the DSP 32 can be outputted from the communication I/F 34 to the outside, and furthermore can be written on the register group 27 of the imaging control section 25 by the CPU 31. A signal processing result written on the register group 27 can be outputted from the communication I/F 26 to the outside. This similarly applies to the processing result of processing performed in the CPU 31.

To the image compression section 35, a captured image is supplied from the imaging processing section 22 via connection line CL2. The image compression section 35 performs compression processing of compressing a captured image, and generates a compressed image having a smaller amount of data than the captured image.

A compressed image generated in the image compression section 35 is supplied to the memory 33 via a bus, and is stored.

Here, signal processing in the DSP 32 can be performed by using a captured image itself, or can be performed by using a compressed image generated from a captured image in the image compression section 35. Since the compressed image has a smaller amount of data than the captured image, the load of signal processing in the DSP 32 can be reduced, and the storage capacity of the memory 33 that stores compressed images can be saved.

As compression processing in the image compression section 35, for example, scale-down in which a captured image of 12M (3968×2976) pixels is converted to an image of a VGA size may be performed. Further, in a case where the signal processing in the DSP 32 is performed on luminance and the captured image is an RGB image, YUV conversion in which the RGB image is converted to, for example, a YUV image may be performed as compression processing.

Note that the image compression section 35 can be obtained by using software, or can be obtained by using dedicated hardware.

The input I/F 36 is an I/F that receives information from the outside. The input I/F 36 receives, for example, an output of an external sensor (external sensor output) from the external sensor, supplies the output to the memory 33 via a bus, and causes the memory 33 to store the output.

As the input I/F 36, for example, a parallel I/F such as a mobile industry processor interface (MIPI), or the like may be used similarly to the output I/F 24.

Further, as the external sensor, for example, a distance sensor that senses information regarding distance may be used; further, as the external sensor, for example, an image sensor that senses light and outputs an image corresponding to the light, that is, an image sensor different from the imaging apparatus 2 may be used.

The DSP 32 can perform signal processing by using a captured image (or a compressed image generated from it) or by using an external sensor output that is received by the input I/F 36 from an external sensor like that described above and is stored in the memory 33.

In the one-chip imaging apparatus 2 configured in the above manner, signal processing using a captured image obtained by imaging in the imaging section 21 (or a compressed image generated from it) is performed in the DSP 32, and a signal processing result of the signal processing and the captured image are selectively outputted from the output I/F 24. Therefore, an imaging apparatus that outputs information required by the user can be configured in a small size.

Here, in a case where signal processing of the DSP 32 is not performed in the imaging apparatus 2 and thus a signal processing result is not outputted but a captured image is outputted from the imaging apparatus 2, that is, in a case where the imaging apparatus 2 is configured as an image sensor that merely captures and outputs an image, the imaging apparatus 2 may include only an imaging block 20 not including an output control section 23.

[1-3. External Appearance Configuration Example of Imaging Apparatus]

Figure 3:
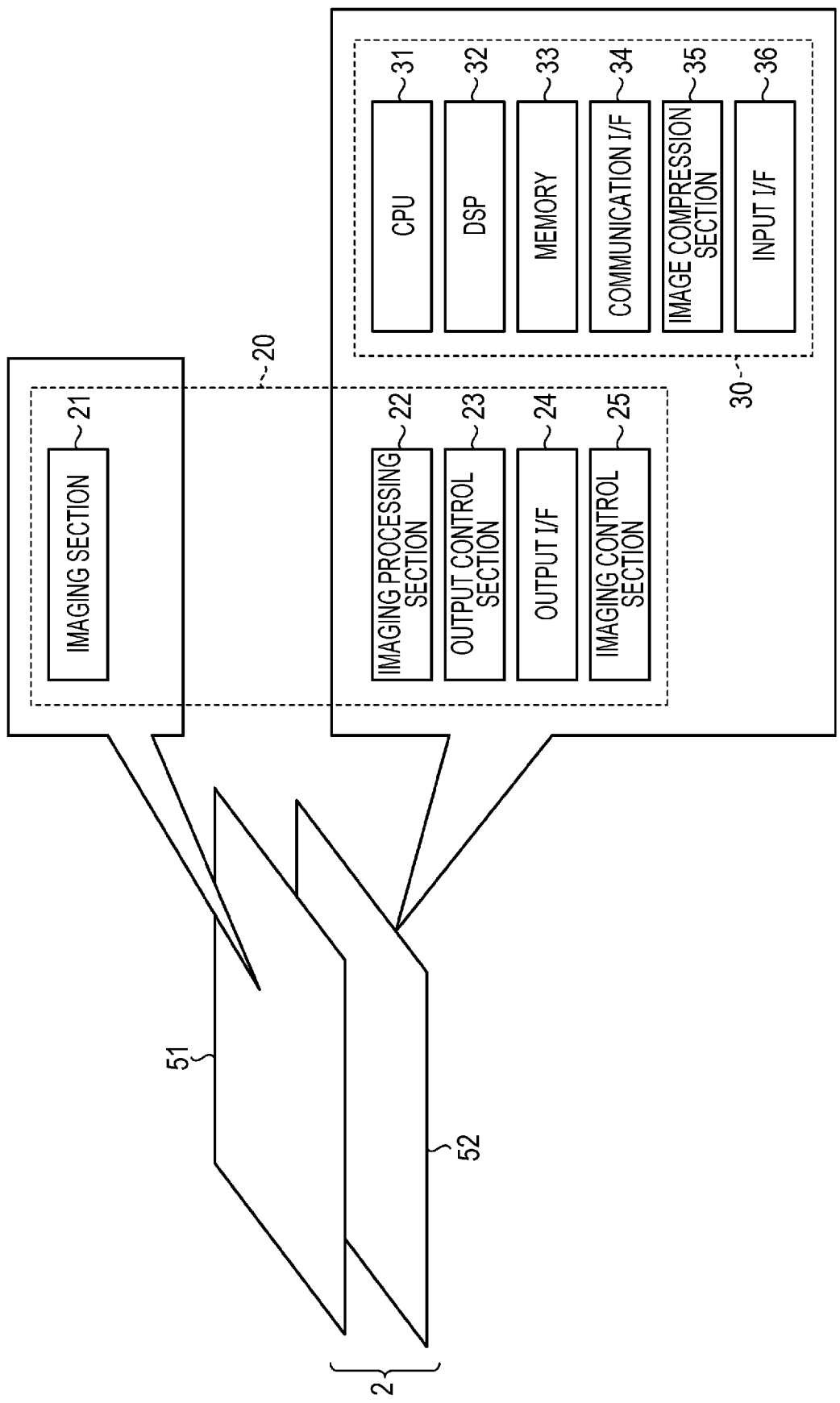
FIG. 3 is a perspective view showing an overview of an external appearance configuration example of an imaging apparatus 2.

FIG. 3 is a perspective view showing an overview of an external appearance configuration example of the imaging apparatus 2 of FIG. 1.

For example, as shown in FIG. 3, the imaging apparatus 2 may be configured as a one-chip semiconductor apparatus having a stacked structure in which a plurality of dies is stacked.

In FIG. 3, the imaging apparatus 2 is configured by stacking two dies of dies 51 and 52.

In FIG. 3, the imaging section 21 is mounted on the upper die 51, and the imaging processing section 22 to the imaging control section 25, and the CPU 31 to the input I/F 36 are mounted on the lower die 52.

The upper die 51 and the lower die 52 are electrically connected by, for example, forming a through hole that penetrates die 51 and reaches die 52, alternatively performing Cu—Cu joining that directly connects Cu wiring exposed on the lower surface side of die 51 and Cu wiring exposed on the upper surface side of die 52, or the like.

Here, in the imaging processing section 22, for example, a column-parallel AD system or an area AD system may be employed as a system for performing AD conversion of an image signal outputted by the imaging section 21.

In the column-parallel AD system, for example, an analog to digital converter (ADC) is provided for a pixel column included in the imaging section 21, and the ADC of each column is in charge of AD conversion of pixel signals of the pixels of the column; thus, AD conversions of image signals of the pixels of the columns of one row are performed in parallel. In a case where the column-parallel AD system is employed, part of the imaging processing section 22 that performs AD conversion of the column-parallel AD system may be mounted on the upper die 51.

In the area AD system, the pixels included in the imaging section 21 are divided into a plurality of blocks, and an ADC is provided for each block. Then, the ADC of each block is in charge of AD conversion of pixel signals of the pixels of the block, and thus AD conversions of image signals of the pixels of the plurality of blocks are performed in parallel. In the area AD system, AD conversion (readout and AD conversion) of image signals can be performed solely for necessary pixels among the pixels included in the imaging section 21, with a block as the minimum unit.

Note that if the area of the imaging apparatus 2 is allowed to be larger, the imaging apparatus 2 may be configured by using one die.

Further, although in FIG. 3 two dies 51 and 52 are stacked to configure a one-chip imaging apparatus 2, a one-chip imaging apparatus 2 may be configured by stacking three or more dies. For example, in a case where three dies are stacked to configure a one-chip imaging apparatus 2, the memory 33 of FIG. 3 may be mounted on another die.

Here, an imaging apparatus in which a sensor chip, a memory chip, and a DSP chip are connected in parallel by a plurality of bumps (hereinafter, also referred to as a bump-connected imaging apparatus) involves a great increase in thickness and an increase in size as compared to a one-chip imaging apparatus 2 configured in a stacked structure.

Moreover, due to signal degradation or the like in the connection portion of the bump, the bump-connected imaging apparatus may have difficulty in securing a sufficient rate to output captured images from the imaging processing section 22 to the output control section 23.

By using an imaging apparatus 2 of a stacked structure, it becomes possible to prevent a size increase of an apparatus like the above and inability to secure a sufficient rate between the imaging processing section 22 and the output control section 23.

Therefore, by using an imaging apparatus 2 of a stacked structure, an imaging apparatus that outputs information required by the user can be configured in a small size.

In a case where the information required by the user is a captured image, the imaging apparatus 2 can output a captured image.

Further, in a case where the information required by the user is obtained by signal processing using a captured image, the imaging apparatus 2, by performing the signal processing in the DSP 32, can obtain and output a signal processing result as information required by the user.

As signal processing performed in the imaging apparatus 2, that is, signal processing of the DSP 32, for example, recognition processing of recognizing a predetermined recognition target from a captured image may be employed.

2. Comparative Example

[2-1. Processing Mode of Comparative Example]

Figure 4:
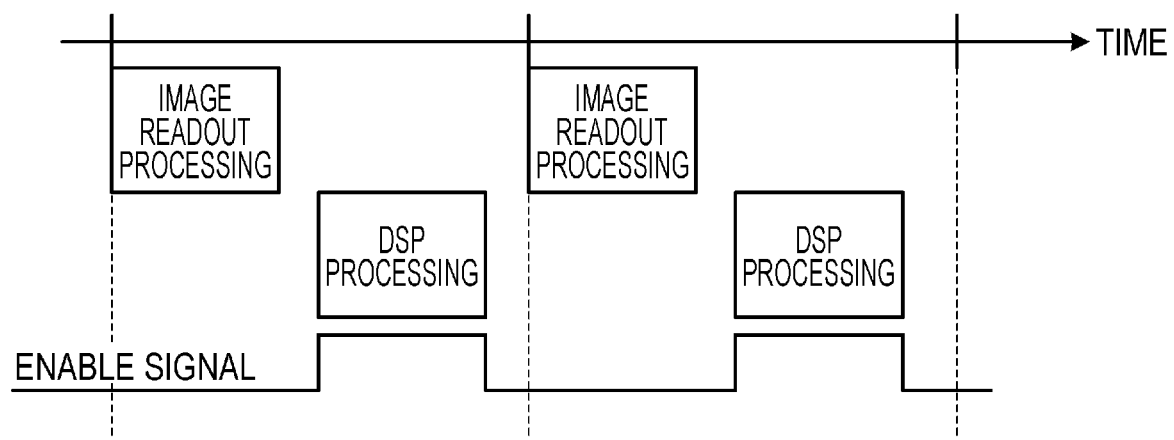
FIG. 4 is a diagram for describing a processing mode of a comparative example.

Before describing embodiments of the present disclosure, a processing mode according to a comparative example is described. FIG. 4 is a diagram for describing a processing mode according to a comparative example.

As shown in FIG. 4, the CPU 31 keeps the enable signal at LOW while the processing of image readout from the imaging section 21 is being executed, and changes the enable signal to HIGH if the image readout processing is ended. Upon detecting that the enable signal is changed to HIGH, the DSP 32 starts DSP processing. After that, if the DSP processing is completed, the CPU 31 changes the enable signal to LOW. As a result, the next round of image readout processing is executed on the imaging section 21.

As shown in FIG. 4, in the comparative example, since DSP processing is executed after image readout, DSP processing may not be completed in one frame in a case where image readout takes long time or in a case where DSP processing takes long time.

3. Embodiments

[3-1. First Processing Mode]

Figure 5:
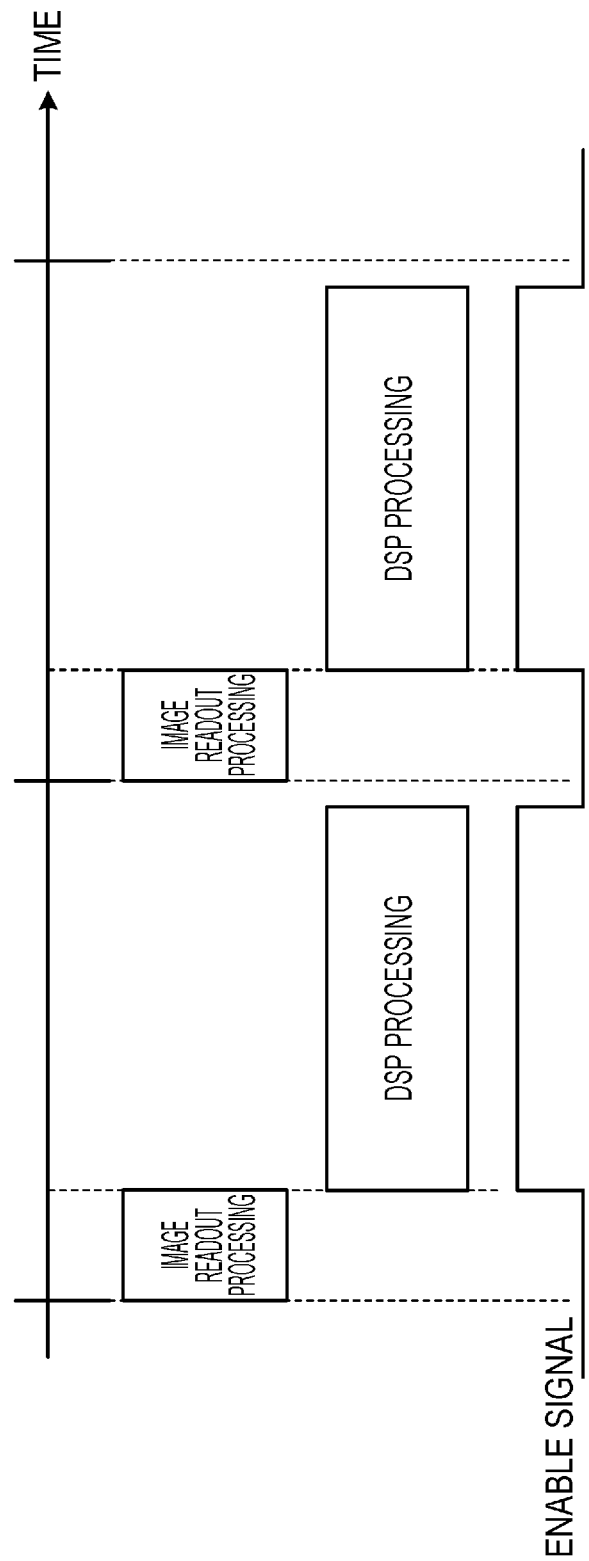
FIG. 5 is a diagram for describing a first processing mode according to an embodiment.

A first processing mode according to an embodiment will now be described using FIG. 5. FIG. 5 is a diagram for describing the first processing mode according to an embodiment.

As shown in FIG. 5, in the first processing mode, the time of image readout processing is set shorter and the time of DSP processing is set longer than in the comparative example. In this case, the CPU 31 outputs, to the imaging control section 25, a control signal for changing the time of image readout processing by the imaging processing section 22. For example, the CPU 31 outputs, to the imaging control section 25, a control signal for causing the imaging processing section 22 to reduce the number of bits (also referred to as AD bits) at the time of AD conversion, alternatively to execute pixel binning processing, or to execute the processing of thinning out the pixels to be read out. The CPU 31 changes the enable signal to HIGH in accordance with the amount of reduction in the time of image readout, and causes the DSP 32 to execute DSP processing. Thus, the CPU 31 can lengthen the time of DSP processing without executing image readout processing and DSP processing in parallel.

In the first processing mode, the time of DSP processing can be secured by shortening the time of image readout processing. In a first embodiment, the DNN recognition system by the DSP can be improved by lengthening the time of DSP processing. That is, the first embodiment can be referred to as an accuracy priority mode.

[3-2. Second Processing Mode]

Figure 6:
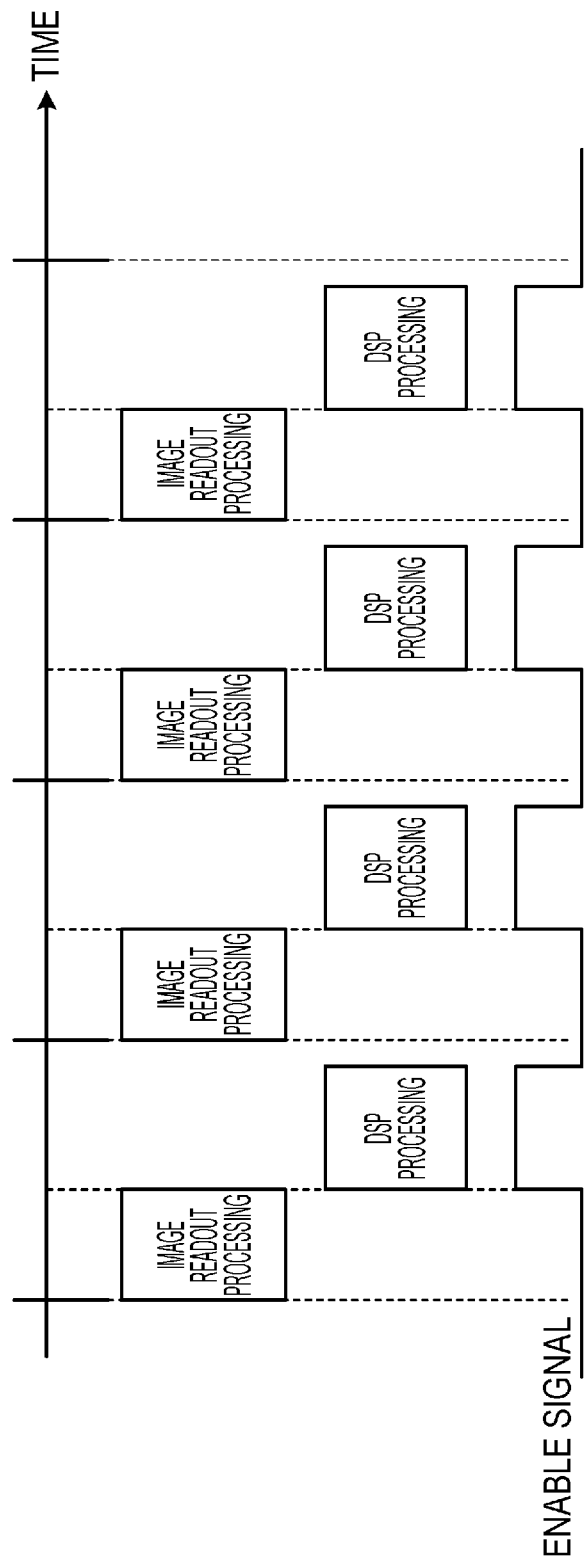
FIG. 6 is a diagram for describing a second processing mode according to an embodiment.

A second processing mode according to an embodiment will now be described using FIG. 6. FIG. 6 is a diagram for describing the second processing mode according to an embodiment.

As shown in FIG. 6, in the second processing mode, the frame rate can be improved as compared to the first processing mode. In this case, the CPU 31 outputs, to the imaging control section 25, a control signal for reducing the time of image readout processing by the imaging processing section 22. For example, the CPU 31 reduces the time of image readout processing by the imaging processing section 22 such that readout processing can be executed twice or more in one frame period. The CPU 31 changes the enable signal to HIGH in accordance with the amount of reduction in the time of image readout, and causes the DSP 32 to execute DSP processing. In a second embodiment, image readout processing and DSP processing are alternately and repeatedly executed in one frame. In the example shown in FIG. 6, image readout processing and DSP processing are each executed twice.

In the second processing mode, image readout processing and DSP processing can be executed multiple times in one frame by shortening the time of image readout processing. Thus, the second embodiment can improve the frame rate. That is, the second embodiment can be referred to as a speed priority mode.

[3-3. Third Processing Mode]

Figure 7:
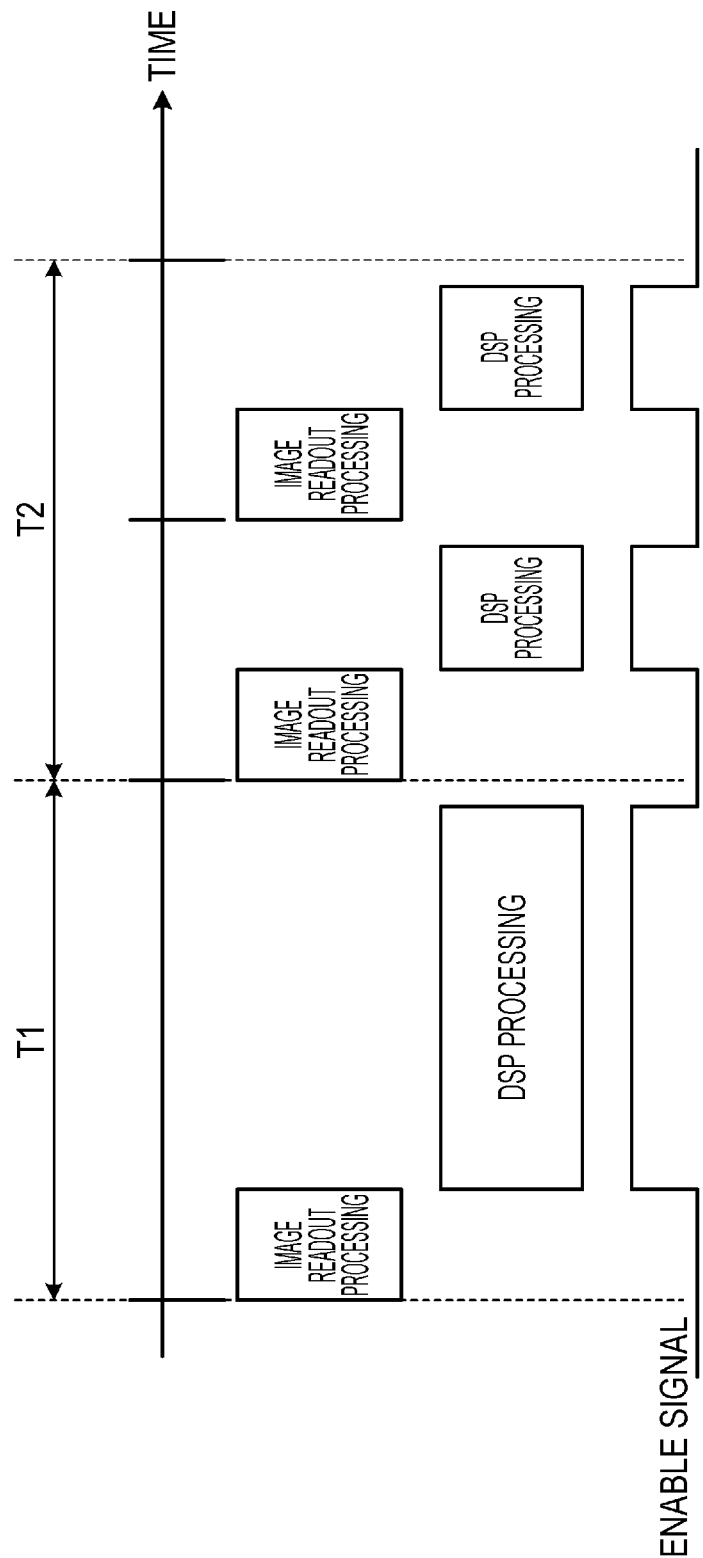
FIG. 7 is a diagram for describing a third processing mode according to an embodiment.

A third processing mode according to an embodiment will now be described using FIG. 7. FIG. 7 is a diagram for describing the third processing mode according to an embodiment.

As shown in FIG. 7, in the third processing mode, the accuracy priority mode and the speed priority mode can be switched by the user's specification. In the example shown in FIG. 7, the accuracy priority mode is chosen in frame period T1, and the speed priority mode is chosen in frame period T2. In a case where priority is given to the accuracy of the DNN, the user is only required to choose the accuracy priority mode. The user can choose a desired mode in accordance with the situation. Thus, the CPU 31 can perform control such that processing with importance attached to accuracy is caused to be executed in frame period T1 and processing with importance attached to speed is executed in frame period T2. That is, the CPU 31 can dynamically change the processing mode in accordance with the user's desire.

[3-4. Fourth Processing Mode]

Figure 8:
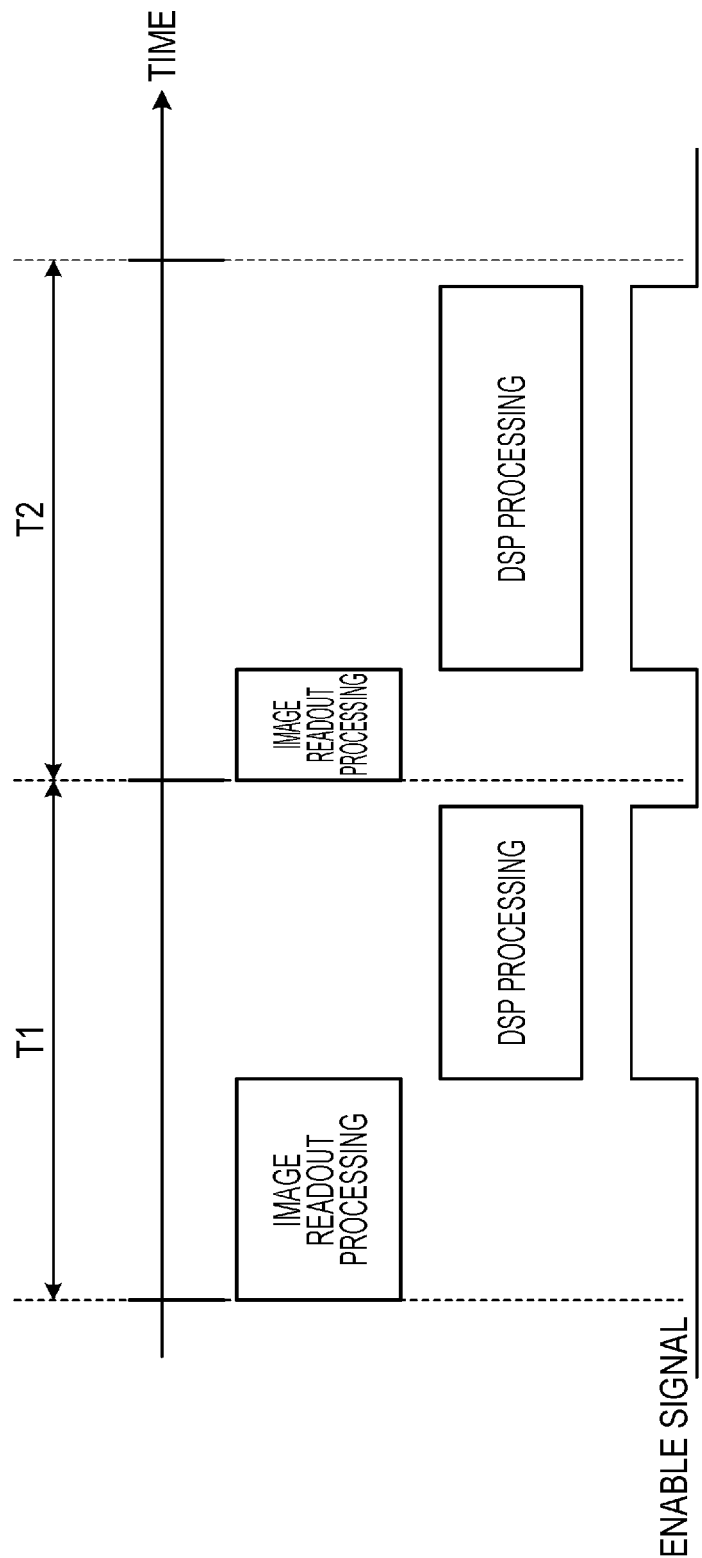
FIG. 8 is a diagram for describing a fourth processing mode according to an embodiment.

A fourth actual processing mode according to an embodiment will now be described using FIG. 8. FIG. 8 is a diagram for describing the fourth processing mode according to an embodiment.

As shown in FIG. 8, in the fourth processing mode, control is performed such that the time of image readout processing is dynamically changed in accordance with the time of DSP processing. In the example shown in FIG. 8, the time of DSP processing of frame period T2 is set longer than the time of DSP processing of frame period T1. In this case, the CPU 31 calculates, for each of frame period T1 and frame period T2, the time required for the DSP 32 to perform DSP processing. In accordance with the calculation result of the time required for DSP processing, the CPU 31 outputs, to the imaging control section 25, a control signal that controls the time of image readout processing by the imaging processing section 22 in frame period T1 and the time of image readout processing by the imaging processing section 22 in frame period T2.

In a fourth embodiment, the CPU 31 performs control in accordance with the time required for the DSP 32 to perform DSP processing. Thus, the fourth embodiment can dynamically control the time of image readout processing in accordance with the time required for DSP processing.

[3-5. Imaging Control Processing]

Figure 9:
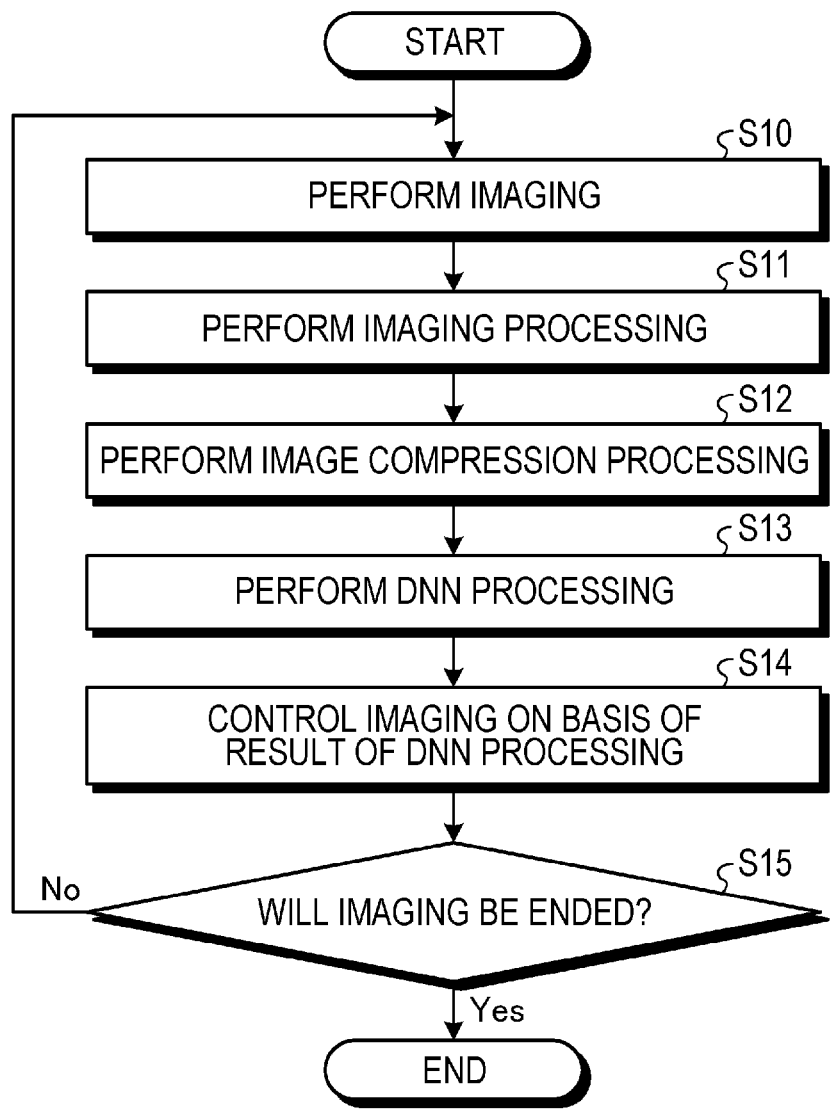
FIG. 9 is a flowchart showing an example of a process of imaging control processing on the basis of the result of DNN processing.

A process of imaging control processing will now be described on the basis of the result of the DNN processing, using FIG. 9. FIG. 9 is a flowchart showing an example of the process of imaging control processing on the basis of the result of the DNN processing.

The CPU 31 outputs a control signal to the imaging control section 25 to cause the imaging section 21 to image the surrounding environment including an imaging target (step S10). Specifically, in accordance with a control signal of the CPU 31, the imaging control section 25 drives the imaging section 21 to cause the imaging section 21 to image the surrounding environment.

The CPU 31 outputs a control signal to the imaging control section 25 to cause the imaging processing section 22 to execute various pieces of imaging processing on the image captured by the imaging section 21 (step S11). The CPU 31 outputs a control signal to the imaging control section 25 to cause the imaging processing section 22 to execute image compression processing in order to execute the DNN processing on the image after imaging processing (step S12).

The CPU 31 outputs a control signal to the DSP 32 to cause the DSP 32 to execute the DNN processing on the image after image compression processing (step S13). The CPU 31 controls imaging processing on the basis of the result of the DNN processing (step S14). A method for controlling imaging processing based on the result of the DNN processing is described later.

The CPU 31 determines whether or not to end the imaging processing (step S15). In a case where it is determined to end the imaging processing (step S15: Yes), the processing of FIG. 9 is ended. On the other hand, in a case where it is determined to continue the imaging processing (step S15: No), the procedure goes to step S10.

Figures 10, 11:
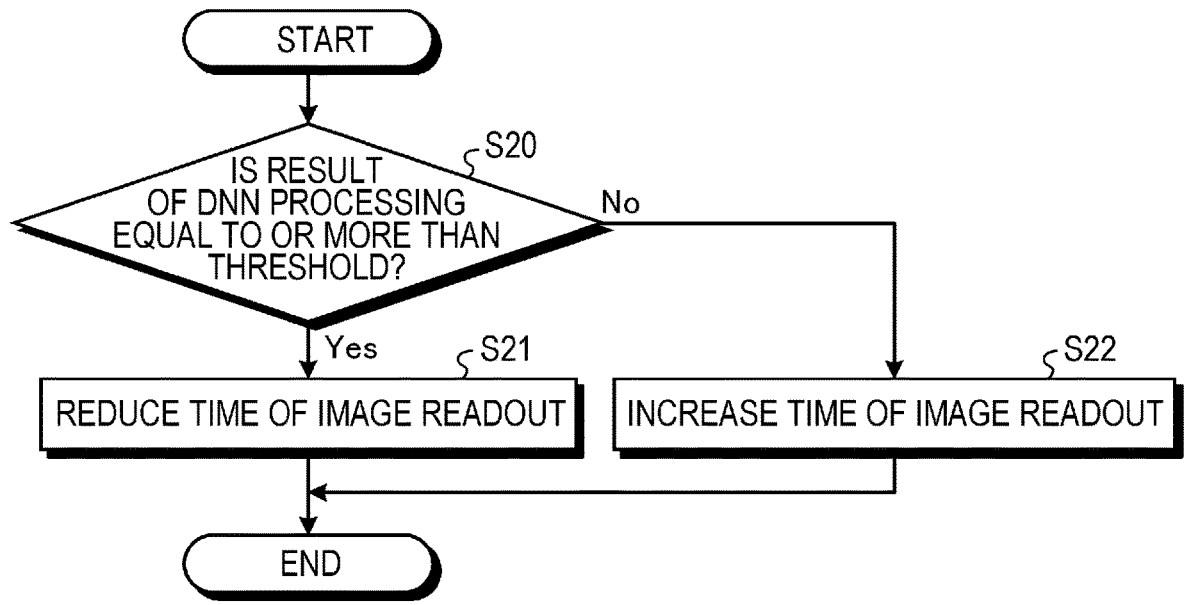
FIG. 10 is a flowchart showing an example of a process of a first example of the processing of imaging control processing based on the result of the DNN processing.
FIG. 11 is a diagram for describing a method for changing the time of image readout.

A first example of imaging control processing based on the result of the DNN processing will now be described using FIG. 10. FIG. 10 is a flowchart showing an example of a process of the first example of the processing of imaging control processing based on the result of the DNN processing.

The CPU 31 determines whether or not the score indicating the recognition system of the result of the DNN processing by the DSP 32 is a predetermined threshold or more (step S20). In a case where it is determined that the score of the result of the DNN processing is the predetermined threshold or more (step S20: Yes), the procedure goes to step S21. On the other hand, in a case where it is determined that the score of the result of the DNN processing is less than the predetermined threshold (step S20: No), the procedure goes to step S22.

In a case where the determination is Yes in step S20, the CPU 31 outputs a control signal to the imaging control section 25 to cause the imaging control section 25 to reduce the time of image readout (step S21). On the other hand, in a case where the determination is No in step S20, the CPU 31 outputs a control signal to the imaging control section 25 to cause the imaging control section 25 to increase the time of image readout (step S22). That is, the CPU 31 changes the time of image readout in accordance with the result of the DNN processing.

A method for changing the time of image readout will now be described using FIG. 11. FIG. 11 is a diagram for describing the method for changing the time of image readout.

FIG. 11 shows an image readout time determination table TB1. The CPU 31 refers to the image readout time determination table TB1 to change the time of image readout. The image readout time determination table TB1 includes items such as "AD bits" and "binning".

The "AD bits" means the number of bits when the imaging processing section 22 performs AD conversion on an analog pixel signal. As the "AD bits", any one of 12 bits, 10 bits, 8 bits, 6 bits, and 4 bits is selected. The larger the number of bits is, the longer the time of image readout is, but the better the performance of the DNN is. The smaller the number of bits is, the shorter the time of image readout is, but the worse the performance of the DNN is.

The "binning" means processing in which the imaging processing section 22 combines pixels to regard the combined pixels as one pixel. As the "binning", any one of Full, V2H2, V4H4, and V8H8 is selected. Full means that binning is not executed. V2H2 means that 2×2 binning processing of two vertical pixels and two horizontal pixels is executed. V4H4 means that 4×4 binning processing of four vertical pixels and four horizontal pixels is executed. V8H8 means that 8×8 binning processing of eight vertical pixels and eight horizontal pixels is executed. In a case where binning is not executed, the time of image readout is longer, but the performance of the DNN is improved; the larger the region where binning is performed is, the shorter the time of image readout is, but the worse the performance of the DNN is.

For example, by selecting control #1, the CPU 31 outputs, to the imaging control section 25, a control signal that causes the imaging processing section 22 to perform processing with the AD bits set to 12 bits and the binning set to Full. That is, the CPU 31 controls both "AD bits" and "binning" by selecting a desired control number (#). The CPU 31 may control either "AD bits" or "binning".

Figure 12:
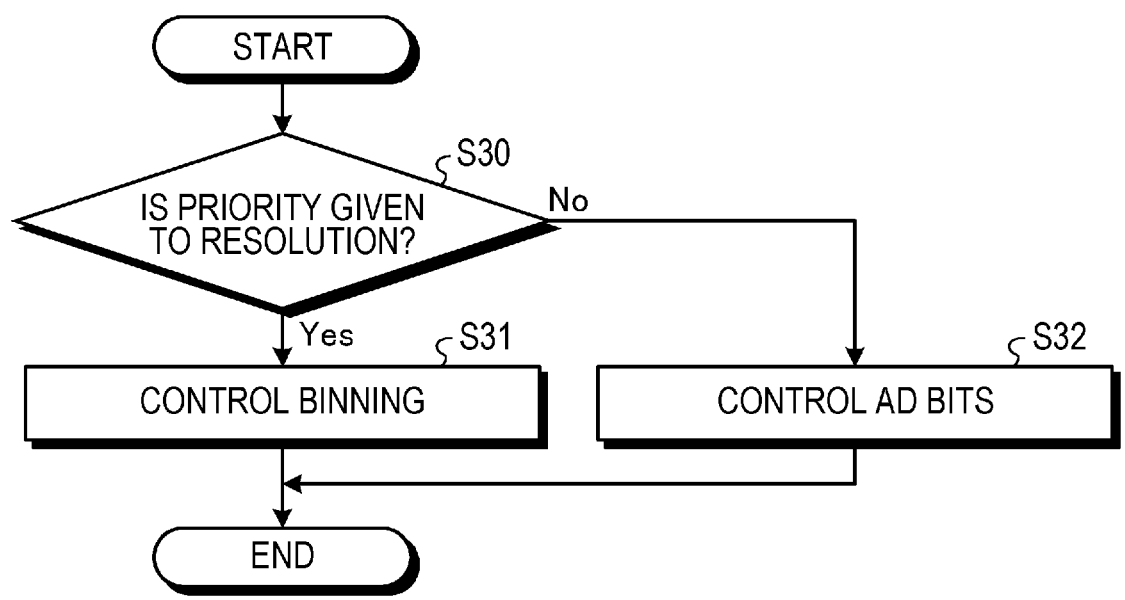
FIG. 12 is a flowchart showing a process of the processing of controlling either AD bits or binning.

A method for controlling either the AD bits or the binning will now be described using FIG. 12. FIG. 12 is a flowchart showing a process of the processing of controlling either the AD bits or the binning.

The CPU 31 determines whether or not to process a captured image with priority given to resolution on the basis of the result of the DNN processing by the DSP 32 (step S30). Specifically, the CPU 31 determines whether or not to perform processing with priority given to resolution on the basis of the subject estimated from the result of the DNN processing. In a case where, for example, the subject is a car, the CPU 31 determines to perform processing with priority given to gradation. In a case where, for example, the subject is a white line, the CPU 31 determines to perform processing with priority given to resolution. In a case where it is determined to give priority to resolution (step S30: Yes), the procedure goes to step S31. In a case where it is determined not to give priority to resolution (step S30: No), the procedure goes to step S32.

In a case where the determination is Yes in step S30, the CPU 31 chooses binning control (step S31). In a case where the determination is No in step S30, the CPU 31 chooses AD bit control (step S32).

As described in FIG. 12, in a case where the subject can be estimated, the CPU 31 can control imaging processing depending on the subject.

[3-6. Resolution Control]

The processing of executing binning processing on a captured image to change the resolution will now be described using FIGS. 13A, 13B, 13C, 13D, and 13E. FIGS. 13A, 13B, 13C, 13D, and 13E are diagrams for describing the processing of changing the resolution of a captured image.

Figure 13A:
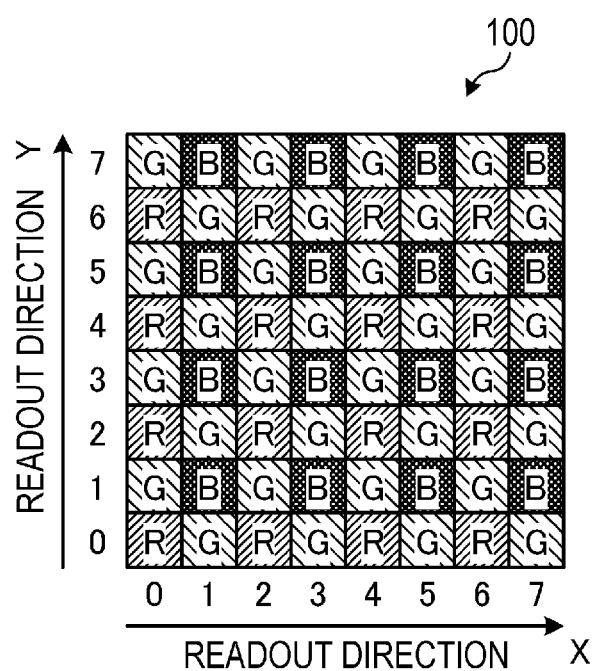
FIG. 13A is a diagram for describing the processing of changing the resolution of a captured image.

FIG. 13A shows pixel circuit 100. In pixel circuit 100, imaging pixels R that receive red light, imaging pixels G that receive green light, and imaging pixels B that receive blue light are arranged. Pixel circuit 100 includes a total of 64 pixels of 8 rows and 8 columns. FIG. 13A shows a state where the binning is Full, that is, a state where binning processing is not executed. In the X direction, pixels are read out in the order of 0 to 7. In the Y direction, pixels are read out in the order of 0 to 7.

FIG. 13B shows pixel circuit 100A. Pixel circuit 100A is a pixel circuit in which 2×0 binning processing is executed on pixel circuit 100. The 0th pixel row of pixel circuit 100A is a pixel row in which the 0th pixel row and the 2nd pixel row of pixel circuit 100 are connected in an analog manner. The 1st pixel row of pixel circuit 100A is a pixel row in which the 1st pixel row and the 3rd pixel row of pixel circuit 100 are connected in an analog manner. The 2nd pixel row of pixel circuit 100A is a pixel row in which the 4th pixel row and the 6th pixel row of pixel circuit 100 are connected in an analog manner. The 3rd pixel row of pixel circuit 100A is a pixel row in which the 5th pixel row and the 7th pixel row of pixel circuit 100 are connected in an analog manner. Thus, pixel circuit 100A is a pixel circuit including a total of 32 pixels of 4 rows and 8 columns.

Figure 13C:
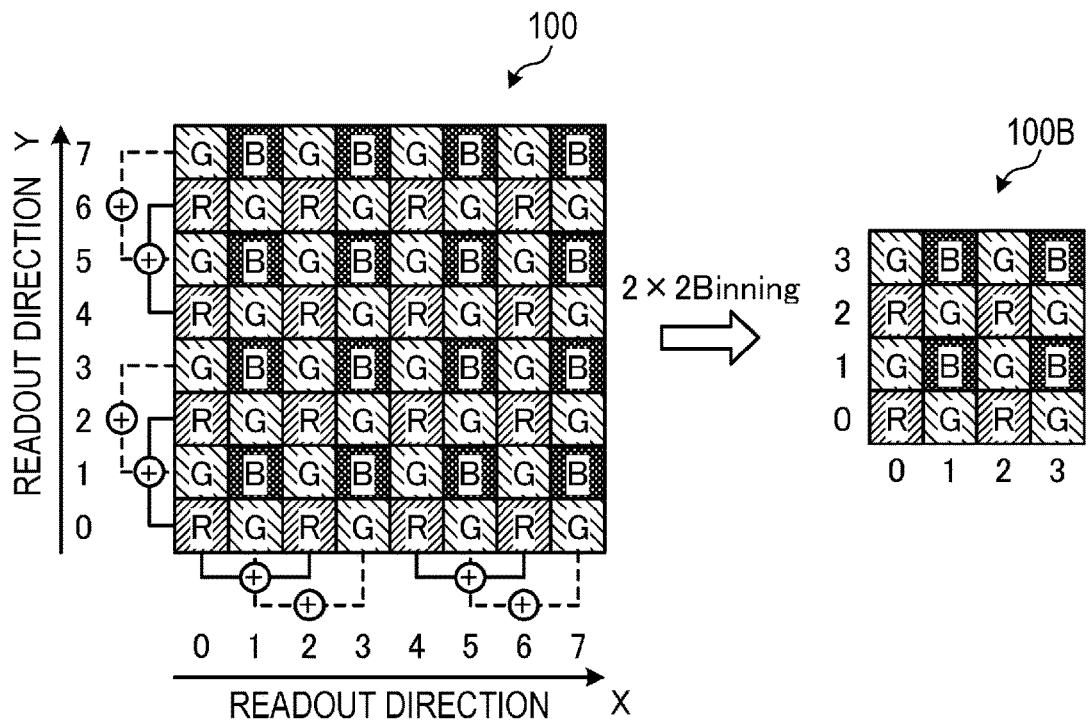
FIG. 13C is a diagram for describing the processing of changing the resolution of a captured image.

FIG. 13C shows pixel circuit 100B. Pixel circuit 100B is a pixel circuit in which 2×2 binning processing is executed on pixel circuit 100. The 0th pixel row of pixel circuit 100B is a pixel row in which the 0th pixel row and the 2nd pixel row of pixel circuit 100 are connected in an analog manner. The 1st pixel row of pixel circuit 100B is a pixel row in which the 1st pixel row and the 3rd pixel row of pixel circuit 100 are connected in an analog manner. The 2nd pixel row of pixel circuit 100B is a pixel row in which the 4th pixel row and the 6th pixel row of pixel circuit 100 are connected in an analog manner. The 3rd pixel row of pixel circuit 100B is a pixel row in which the 5th pixel row and the 7th pixel row of pixel circuit 100 are connected in an analog manner. The 0th pixel column of pixel circuit 100B is a pixel column in which the 0th pixel column and the 2nd pixel column of pixel circuit 100 are connected in an analog manner. The 1st pixel column of pixel circuit 100B is a pixel column in which the 1st pixel column and the 3rd pixel column of pixel circuit 100 are connected in an analog manner. The 2nd pixel column of pixel circuit 100B is a pixel column in which the 4th pixel column and the 6th pixel column of pixel circuit 100 are connected in an analog manner. The 3rd pixel column of pixel circuit 100B is a pixel column in which the 5th pixel column and the 7th pixel column of pixel circuit 100 are connected in an analog manner. Thus, pixel circuit 100B is a pixel circuit including a total of 16 pixels of 4 rows and 4 columns.

Figure 13D:
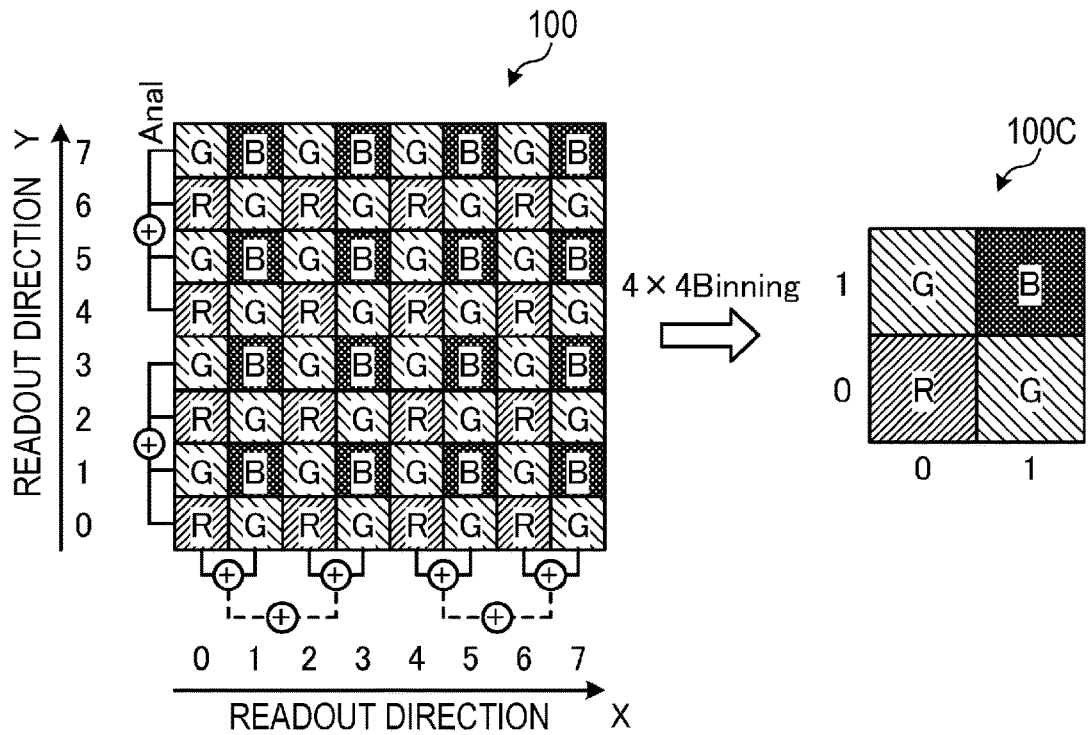
FIG. 13D is a diagram for describing the processing of changing the resolution of a captured image.

FIG. 13D shows pixel circuit 100C. Pixel circuit 100C is a pixel circuit in which 4×4 binning processing is executed on pixel circuit 100. In this case, the 0th to 3rd pixel rows of pixel circuit 100 are connected in an analog manner, and the 4th to 7th pixel rows are connected in an analog manner. Further, the 0th and 1st pixel columns of pixel circuit 100 are connected in an analog manner, and the 2nd and 3rd pixel columns are connected in an analog manner. Further, the 4th and 5th pixel columns of pixel circuit 100 are connected in an analog manner, and the 6th and 7th pixel columns are connected in an analog manner. Further, the 0th and 1st pixel columns connected in an analog manner and the 2nd and 3rd pixel columns connected in an analog manner of pixel circuit 100 are connected in a digital manner. Further, the 4th and 5th pixel columns connected in an analog manner and the 6th and 7th pixel columns connected in an analog manner of pixel circuit 100 are connected in a digital manner. Thus, pixel circuit 100 becomes a pixel circuit 100C of 2 rows and 2 columns.

FIG. 13E shows pixel circuit 200. Pixel circuit 200 includes a total of 128 pixels of 16×8. In pixel circuit 200, the 0th to 3rd pixel rows and the 8th to 11th pixel rows have been read out. On the other hand, in pixel circuit 200, the 4th to 7th pixel rows and the 12th to 15th pixel rows have not been read out. In this case, the 0th and 2nd pixel rows of pixel circuit 200 are connected in an analog manner. The 1st and 3rd pixel rows of pixel circuit 200 are connected in an analog manner. The 8th and 10th pixel rows of pixel circuit 200 are connected in an analog manner. The 9th and 11th pixel rows of pixel circuit 200 are connected in an analog manner.

Thus, pixel circuit 200 becomes a pixel circuit 200A of 4 rows and 8 columns.

In the present disclosure, as described in FIGS. 13A, 13B, 13C. 13D, and 13E, the load of DSP processing can be reduced by executing binning processing to thin out the pixel regions to be read out. In other words, the time of DSP processing can be reduced by reducing the load of DSP processing.

Figure 14B:
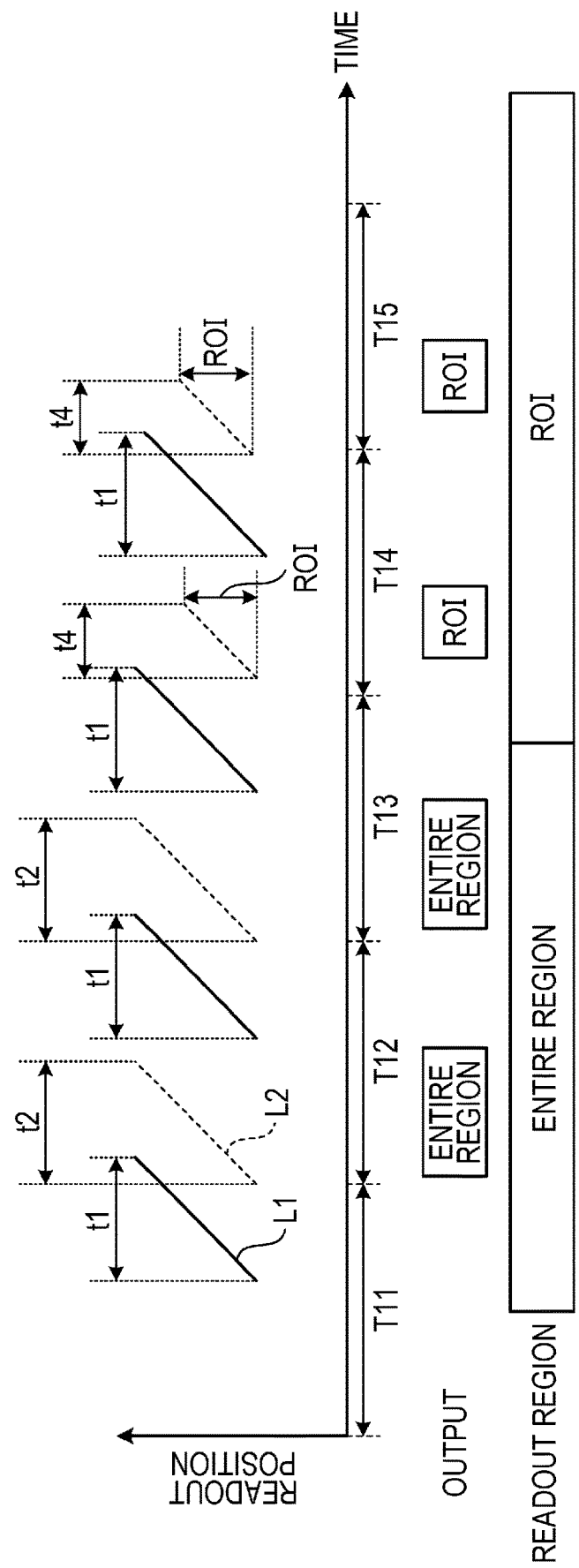
FIG. 14B is a diagram for describing a method for reading out an ROI.

In the present disclosure, the time of DSP processing can be reduced by limiting the imaging region to a region of interest (ROI). A method for reading out an ROI will now be described using FIGS. 14A and 14B. FIGS. 14A and 14B are diagrams for describing a method for reading out an ROI. In FIGS. 14A and 14B, the description is given on the assumption that the ROI is a central region of a captured image.

[3-7. ROI Control]

FIG. 14A shows processing in a case where both exposure and readout processing are limited to the ROI when limiting the readout region of the captured image to the ROI. In FIG. 14A, the straight line L1 indicates readout processing, and the dotted line L2 indicates readout processing.

For example, exposure processing is executed for period t1 lasting from frame period T11 to frame period T12. Then, the captured image obtained by exposure processing in frame period T11 to frame period T12 is subjected to readout processing for period t2 in frame period T12. As a result, a captured image of the entire region is outputted in frame period T12. Similarly, exposure processing is executed for period t1 lasting from frame period T12 to frame period T13. Then, the captured image obtained by exposure processing in frame period T12 to frame period T13 is subjected to readout processing for period t2 in frame period T13. As a result, a captured image of the entire region is outputted in frame period T13.

Here, it is assumed that the readout region is limited to the ROI in the course of frame period T13. In the example shown in FIG. 14A, since both exposure and readout processing are limited to the ROI, readout processing is not executed on a captured image for which exposure is started in frame period T13 before the readout region is limited to the ROI, and therefore this captured image is not outputted. In FIG. 14A, line L3 indicated by the chain line indicates that readout processing is not started.

Then, exposure processing of the ROI region of a captured image is executed for period T3 in frame period T14. Then, the captured image obtained by exposure processing in frame period T14 is subjected to readout processing for period T4 from frame period T14 to frame period T15. As a result, a captured image of the ROI region is outputted in frame period T15.

On the other hand, FIG. 14B shows processing in a case where only readout processing is limited to the ROI when limiting the readout region of the captured image to the ROI. The processing until the readout region is limited to the ROI is similar to that of FIG. 14A, and a description is omitted.

It is assumed that the readout region is limited to the ROI in the course of frame period T13. In the example shown in FIG. 14B, since only readout processing is limited to the ROI, readout processing is executed even om a captured image for which exposure is started in frame period T13 before the readout region is limited to the ROI. Hence, for the captured image of which the entire region is exposed in frame period T13 to frame period T14, readout processing of only the ROI region is executed in frame period T14. As a result, a captured image of the ROI region is outputted in frame period T14.

Then, exposure processing of the ROI region of a captured image is executed for period t4 in frame period T14. Then, the captured image obtained by exposure processing in frame period T14 is subjected to readout processing for period t4 from frame period T14 to frame period T15. As a result, a captured image of the ROI region is outputted in frame period T15. Further, exposure processing is executed for period t1 lasting from frame period T14 to frame period T15. Then, for the captured image obtained by exposure processing in frame period T14 to frame period T15, readout processing of the ROI region is executed in frame period T15. As a result, a captured image of the ROI region is outputted in frame period T15.

[3-8. FPS Control]

In the present disclosure, the frames per second (FPS) may be controlled in accordance with the result of the DNN processing.

Figure 15:
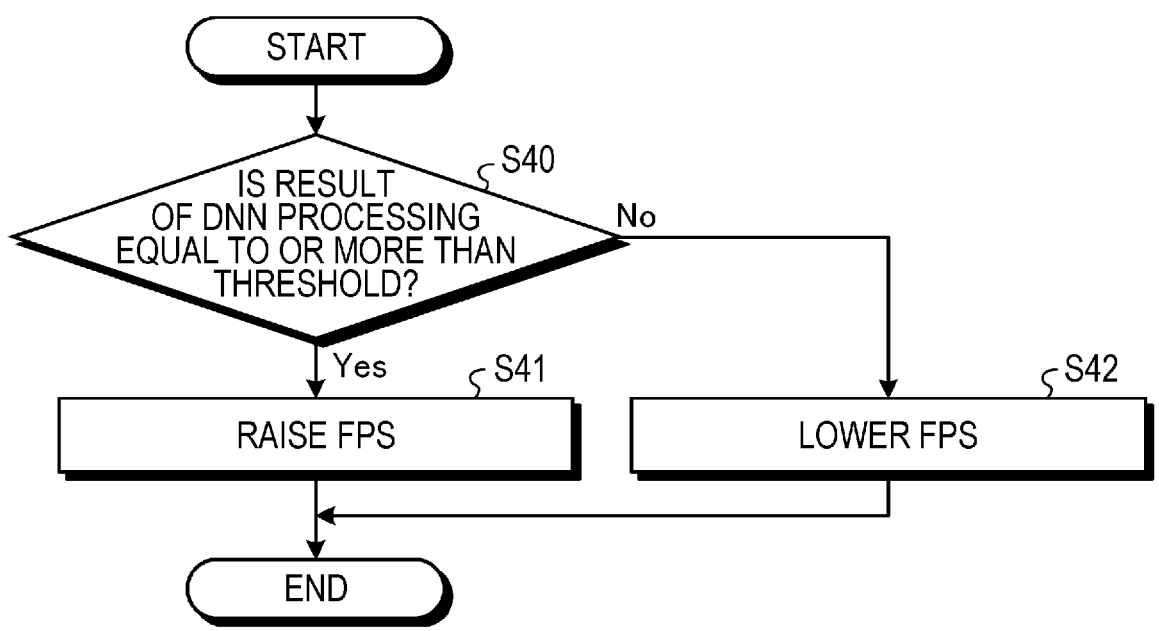
FIG. 15 is a flowchart showing an example of a process of the processing of controlling the FPS in accordance with the result of the DNN processing.

A method for controlling the FPS in accordance with the result of the DNN processing will now be described using FIG. 15. FIG. 15 is a flowchart showing an example of a process of the processing of controlling the FPS in accordance with the result of the DNN processing.

The CPU 31 determines whether or not the score indicating the recognition system of the result of the DNN processing by the DSP 32 is a predetermined threshold or more (step S40). In a case where it is determined that the score of the result of the DNN processing is the predetermined threshold or more (step S40: Yes), the procedure goes to step S41. On the other hand, in a case where it is determined that the score of the result of the DNN processing is less than the predetermined threshold (step S40: No), the procedure goes to step S42.

In a case where the determination is Yes in step S40, the CPU 31 outputs a control signal to the imaging control section 25 to raise the FPS (step S41). On the other hand, in a case where the determination is No in step S40, the CPU 31 outputs a control signal to the imaging control section 25 to lower the FPS (step S42). That is, the CPU 31 changes the FPS in accordance with the result of the DNN processing.

[3-9. Class Sorting]

Figure 16A:
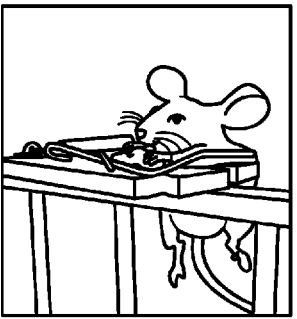
FIG. 16A is a diagram for describing an example of a method for changing the FPS.
Figure 16B:
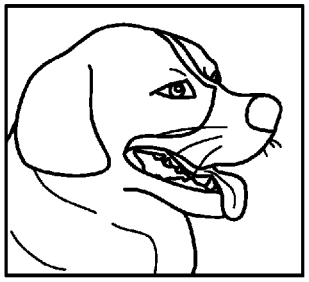
FIG. 16B is a diagram for describing an example of a method for changing the FPS.

An example of a method for changing the FPS will now be described using FIGS. 16A and 16B. FIGS. 16A and 16B are diagrams for describing an example of a method for changing the FPS. FIGS. 16A and 16B show results of determination of class sorting as an example of a method for changing the FPS.

FIG. 16A shows a result of class recognition by the DSP 32 in a case where the FPS will be raised. As shown in FIG. 16A, the recognition result includes items such as "recognition target", "class", and "score".

The "recognition target" indicates an image of a recognition target that the DSP 32 recognizes the class of. The "class" indicates a class that the recognition target belongs to. The "score" indicates the probability that the recognition target is classified into the corresponding class. In the example shown in FIG. 16A, the score of "mousetrap" is "0.36". This indicates that the probability that the recognition target is classified into "mousetrap" is 36%. The score of "marmoset" is "0.07". This indicates that the probability that the recognition target is classified into "marmoset" is 7%. The score of "house finch" is "0.05". This indicates that the probability that the recognition target is "house finch" is 5%.

The recognition target of FIG. 16A is a mousetrap. Here, the threshold of the score is set to 0.3. In this case, the score of the mousetrap is more than a threshold for being 0.36. In this case, the CPU 31 outputs a control signal to the imaging control section 25 to raise the FPS. Thus, the speed of the DNN processing of the DSP 32 can be improved.

FIG. 16B shows a result of class recognition by the DSP 32 in a case where the FPS will be lowered. As shown in FIG. 16B, the recognition result includes items such as "recognition target", "class", and "score".

In the example shown in FIG. 16B, the score of "beagle" is "0.26". This indicates that the probability that the recognition target is classified into "beagle" is 26%. The score of "foxhound" is "0.23". This indicates that the probability that the recognition target is classified into "foxhound" is 23%. The score of "English foxhound" is "0.17". This means that the probability that the recognition target is "English foxhound" is 17%.

The recognition target of FIG. 16B is an English foxhound. Here, the threshold of the score is set to 0.3. In this case, the score of the English foxhound is 0.17, which is below the threshold. In this case, the CPU 31 outputs a control signal to the imaging control section 25 to lower the FPS. Thus, the recognition rate of the DNN processing of the DSP 32 can be improved.

[3-10. Key Point Processing]

Figure 17:
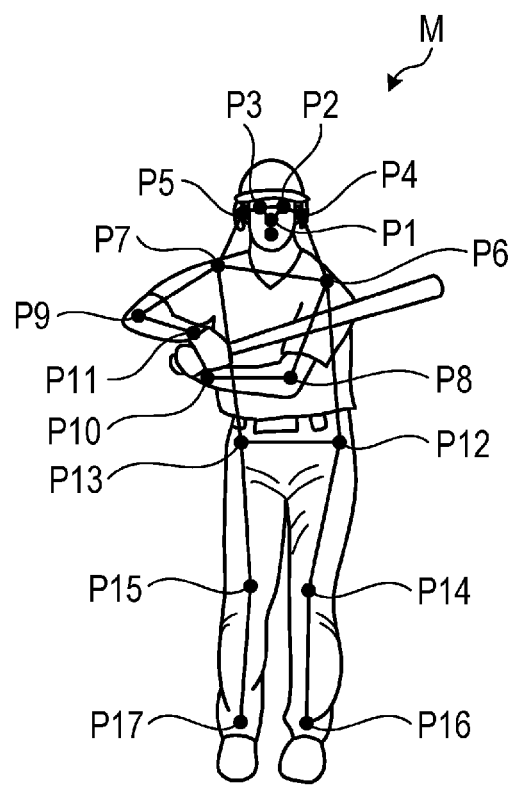
FIG. 17 is a diagram for describing key point processing as an example of a method for changing the FPS.

An example of a method for changing the FPS will now be described using FIG. 17. FIG. 17 is a diagram for describing an example of a method for changing the FPS. FIG. 17 shows key point processing as an example of a method for changing the FPS.

As shown in FIG. 17, the CPU 31 may change the fps in accordance with the result of key point detection of a person M. FIG. 17 shows 17 key points of points P1 to P17.

Point P1 is the nose. Point P2 is the left eye. Point P3 is the right eye. Point P4 is the left ear. Point P5 is the right ear. Point P6 is the left shoulder. Point P7 is the right shoulder. Point P8 is the left elbow, and point P9 is the right elbow. Point P10 is the left wrist. Point P11 is the right wrist. Point P12 is the left hip. Point P13 is the right hip. Point P14 is the left knee. Point P15 is the right knee. Point P16 is the left ankle. Point P17 is the right ankle.

In key point acquisition processing, the average value or the minimum value of the accuracies of key points acquired by the DSP 32 may be regarded as the result of the DNN processing. Then, if the average value or the minimum value of accuracy is more than a predetermined threshold, the CPU 31 raises the fps. Thus, the speed of the DNN processing of the DSP 32 can be improved. Further, if the average value or the minimum value of accuracy is less than the predetermined threshold, the CPU 31 lowers the fps. Thus, the accuracy of key point acquisition can be improved.

4. Effects

A solid-state imaging apparatus 2 according to the present disclosure includes: an imaging section 21 that acquires image data; and a control section (CPU 31) that changes time of reading out the image data in accordance with time of the DNN processing on the image data.

Thus, the solid-state imaging apparatus 2 can change the time of reading out the image data in accordance with the time of the DNN processing, and therefore can appropriately execute processing in one frame period.

The CPU 31, after image data is read out, causes the DNN processing on the image data to be executed. Thus, the solid-state imaging apparatus 2 avoids a situation where readout processing of the image data and the DNN processing are executed in parallel, and therefore can appropriately execute processing in one frame period.

The CPU 31 changes the time of reading out the image data in accordance with the result of the DNN processing on the image data. Thus, the solid-state imaging apparatus 2 can appropriately execute processing that attaches importance to accuracy in one frame period and in which the time of reading out the image data can be changed in accordance with the result of the DNN processing.

The CPU 31, in accordance with the result of the DNN processing on the image data, changes the frame rate at which image data should be read out. Thus, the solid-state imaging apparatus 2 can, in accordance with the result of the DNN processing, change the frame rate at which image data should be read out, and therefore can appropriately execute processing with importance attached to speed in one frame period.

The CPU 31 dynamically controls time of processing on the image data and the time of reading out the image data. Thus, the solid-state imaging apparatus 2 can appropriately execute processing in one frame period in a case where the user desires it, alternatively in a case where the load of the DNN processing changes for each one frame period, or in like cases.

The CPU 31 controls, for each frame period, the time of calling the image data for the each frame period in accordance with the time of the DNN processing. Thus, the solid-state imaging apparatus 2 can control the time of reading out the image data for each frame period, and therefore can appropriately execute processing in one frame period.

The CPU 31 reduces the time of reading out the image data in a case where the score of the result of the DNN processing on the image data is more than a predetermined score, and increases the time of reading out the image data in a case where the score is less than the predetermined score. Thus, the solid-state imaging apparatus 2 can reduce or increase the time of reading out the image data on the basis of the accuracy of DNN recognition processing or the like, and therefore can appropriately execute processing in one frame period.

The CPU 31 determines the time of reading out the image data in accordance with an image readout time determination table. Thus, the solid-state imaging apparatus 2 can control the time of image readout in accordance with a predetermined image readout time determination table, and therefore can appropriately execute processing in one frame period.

The CPU 31 executes either the control of AD bits or the control of binning processing to change the time of reading out the image data. Thus, the solid-state imaging apparatus 2 can control the time of reading out the image data by the control of AD bits or the control of binning processing, and therefore can appropriately execute processing in one frame period.

The CPU 31, on the basis of the result of the DNN processing on the image data, causes binning processing to be executed in a case where priority is given to resolution and controls AD bits in a case where priority is given to gradation. Thus, the solid-state imaging apparatus 2 can make switching between binning processing and the control of AD bits in accordance with whether to control either resolution or gradation, and therefore can appropriately execute processing in one frame period.

The CPU 31 reduces the time of reading out the image data in a case where the result of the score of class sorting is more than a predetermined score and increases the time of reading out the image data in a case where the result is less than the predetermined score. Thus, the solid-state imaging apparatus 2 can control the time of reading out the image data in accordance with the result of the score of class sorting, and therefore can appropriately execute processing in one frame.

Further, the effects described in the present specification are merely explanatory or exemplified effects, and are not limitative ones. That is, the technology according to the present disclosure can achieve, together with or in place of the above effects, other effects that are clear to those skilled in the art from the description of the present specification.

Additionally, the present technology may also be configured as below.

(1)

A solid-state imaging apparatus including:

an imaging section that acquires image data; and a control section that changes time of reading out the image data in accordance with time of DNN processing on the image data.

(2)

The solid-state imaging apparatus according to (1), in which the control section causes the DNN processing on the image data to be executed after reading out the image data.

(3)

The solid-state imaging apparatus according to (1) or (2), in which the control section changes the time of reading out the image data in accordance with a result of the DNN processing on the image data.

(4)

The solid-state imaging apparatus according to any one of (1) to (3), in which the control section, in accordance with a result of the DNN processing on the image data, changes a frame rate at which the image data should be read out.

(5)

The solid-state imaging apparatus according to any one of (1) to (4), in which the control section dynamically controls the time of processing on the image data and time of reading out the image data.

(6)

The solid-state imaging apparatus according to (5), in which the control section controls, each frame period, time of calling the image data for the each frame period in accordance with time of the DNN processing.

(7)

The solid-state imaging apparatus according to any one of (1) to (6), in which the control section reduces the time of reading out the image data in a case where a score of the result of the DNN processing on the image data is more than a predetermined score, and increases the time of reading out the image data in a case where the score is less than the predetermined score.

(8)

The solid-state imaging apparatus according to (7), in which the control section determines the time of reading out the image data in accordance with an image readout time determination table.

(9)

The solid-state imaging apparatus according to (7) or (8), in which the control section executes either control of AD bits or control of binning processing to change the time of reading out the image data.

(10)

The solid-state imaging apparatus according to any one of (7) to (9), in which the control section, on the basis of a result of the DNN processing on the image data, causes binning processing to be executed in a case where priority is given to resolution and controls AD bits in a case where priority is given to gradation.

(11)

The solid-state imaging apparatus according to any one of (7) to (10), in which the control section reduces the time of reading out the image data in a case where a result of a score of class sorting is more than a predetermined score and increases the time of reading out the image data in a case where the result is less than the predetermined score.

REFERENCE SIGNS LIST

1 Optical system
2 Imaging apparatus
3 Memory
4 Signal processing section
5 Output section
6 Control section
20 Imaging block
21 Imaging section
22 Imaging processing section
23 Output control section
24 Output I/F
25 Imaging control section
26 Communication I/F
27 Register group
30 Signal processing block
31 CPU
32 DSP
33 Memory
34 Communication I/F
35 Image compression section
36 Input I/F
51, 52 Die

The invention claimed is:

1. A solid-state imaging apparatus, comprising:
an imaging section configured to acquire image data; and
a control section configured to:
change a time of a read out of the image data, based on a time of a Deep Neural Network (DNN) processing operation on the image data and a result of the DNN processing operation;
reduce the time of the read out of the image data based on a score of the result that is more than a first score; and
increase the time of the read out of the image data based on the score of the result that is less than the first score.

2. The solid-state imaging apparatus according to claim 1, wherein the control section is further configured to execute the DNN processing operation on the image data after the read out of the image data.

3. The solid-state imaging apparatus according to claim 1, wherein the control section is further configured to change, based on the result of the DNN processing operation on the image data, a frame rate at which the image data is read out.

4. The solid-state imaging apparatus according to claim 1, wherein the control section is further configured to dynamically control a time of a specific operation on the image data and the time of the read out of the image data.

5. The solid-state imaging apparatus according to claim 4, wherein the control section is further configured to control, for each frame period of a plurality of frame periods, a time of calling the image data based on the time of the DNN processing operation.

6. The solid-state imaging apparatus according to claim 1, wherein the control section is further configured to determine the time of the read out of the image data based on an image readout time determination table.

7. The solid-state imaging apparatus according to claim 6, wherein the control section is further configured to control one of analog to digital (AD) bits or a binning process to change the time of the read out of the image data.

8. The solid-state imaging apparatus according to claim 7, wherein the control section is further configured to:
control, based on the result of the DNN processing operation on the image data, the binning process in a case where priority is given to resolution; and
control, based on the result of the DNN processing operation on the image data, the AD bits in a case where priority is given to gradation.

9. The solid-state imaging apparatus according to claim 1, wherein the control section is further configured to:
reduce the time of the read out of the image data based on a score of a class sorting process that is more than a second score; and
increase the time of the read out of the image data based on the score of the class sorting process that is less than the second score.

\* \* \* \* \*